(12) United States Patent
Hansson

(10) Patent No.: US 10,909,961 B2
(45) Date of Patent: Feb. 2, 2021

(54) REDUCTION OF MICROPHONE AUDIO NOISE FROM GIMBAL MOTOR

(71) Applicant: GoPro, Inc., San Mateo, CA (US)

(72) Inventor: Per Magnus Fredrik Hansson, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 4 days.

(21) Appl. No.: 15/901,035

(22) Filed: Feb. 21, 2018

(65) Prior Publication Data

US 2019/0259366 A1 Aug. 22, 2019

(51) Int. Cl.
*G10K 11/175* (2006.01)
*H04N 5/232* (2006.01)

(52) U.S. Cl.
CPC ......... *G10K 11/175* (2013.01); *H04N 5/2328* (2013.01); *B64C 2201/027* (2013.01)

(58) Field of Classification Search
CPC .... G05D 1/0094; G06K 9/0063; G06K 9/209; G03B 15/006; G03B 17/561; H04N 5/23296; H04N 5/23206; H04N 5/23258; H04N 5/2328; H04N 5/23299; G02B 27/646; H04R 3/04; H04R 2410/07; H04R 3/005; H04R 2499/13; B64C 2201/146; B64C 2201/127; B64C 39/024; B64C 2201/027; G10K 2210/1281; G10K 2210/3028; G10K 11/175; G10K 2210/1291; G10K 11/17823; G10K 11/17873; G10K 11/178; B64D 47/08
See application file for complete search history.

(56) References Cited

U.S. PATENT DOCUMENTS

| | | | |
|---|---|---|---|
| 5,243,661 A * | 9/1993 | Ohkubo | G10K 11/178 381/94.2 |
| 9,415,870 B1 * | 8/2016 | Beckman | B64C 39/024 |
| 9,442,496 B1 * | 9/2016 | Beckman | G10K 11/178 |
| 9,500,755 B2 * | 11/2016 | Nonaka | H04N 5/32 |
| 2014/0138477 A1 * | 5/2014 | Keennon | B64C 27/12 244/17.23 |
| 2014/0218183 A1 * | 8/2014 | Van Schyndel | G06F 3/016 340/407.1 |
| 2014/0267810 A1 * | 9/2014 | Webb | H04N 5/2328 348/208.6 |
| 2016/0063987 A1 * | 3/2016 | Xu | B64C 39/024 381/71.12 |
| 2016/0076892 A1 * | 3/2016 | Zhou | B64C 39/024 701/3 |
| 2016/0352992 A1 * | 12/2016 | Saika | H04N 5/2328 |
| 2018/0005643 A1 * | 1/2018 | Tsingos | G10L 21/0208 |
| 2018/0075834 A1 * | 3/2018 | Fong | H04R 3/04 |

* cited by examiner

*Primary Examiner* — Lin Ye
*Assistant Examiner* — Tuan H Le
(74) *Attorney, Agent, or Firm* — Young Basile Hanlon & MacFarlane, P.C.

(57) ABSTRACT

Systems and methods are disclosed for reducing unwanted noise during image capture. The noise may be airborne or structure-borne. For example, airborne sound may be sound that is emitted from a motor of a motorized gimbal into the air, which is then detected by a microphone of an imaging device along with the desired sound. Structure-borne noise may include vibrations from the motor that reach the microphone. Structure-borne noise may lead to local acoustic pressure variation by the microphone or pure vibration of the microphone.

20 Claims, 9 Drawing Sheets

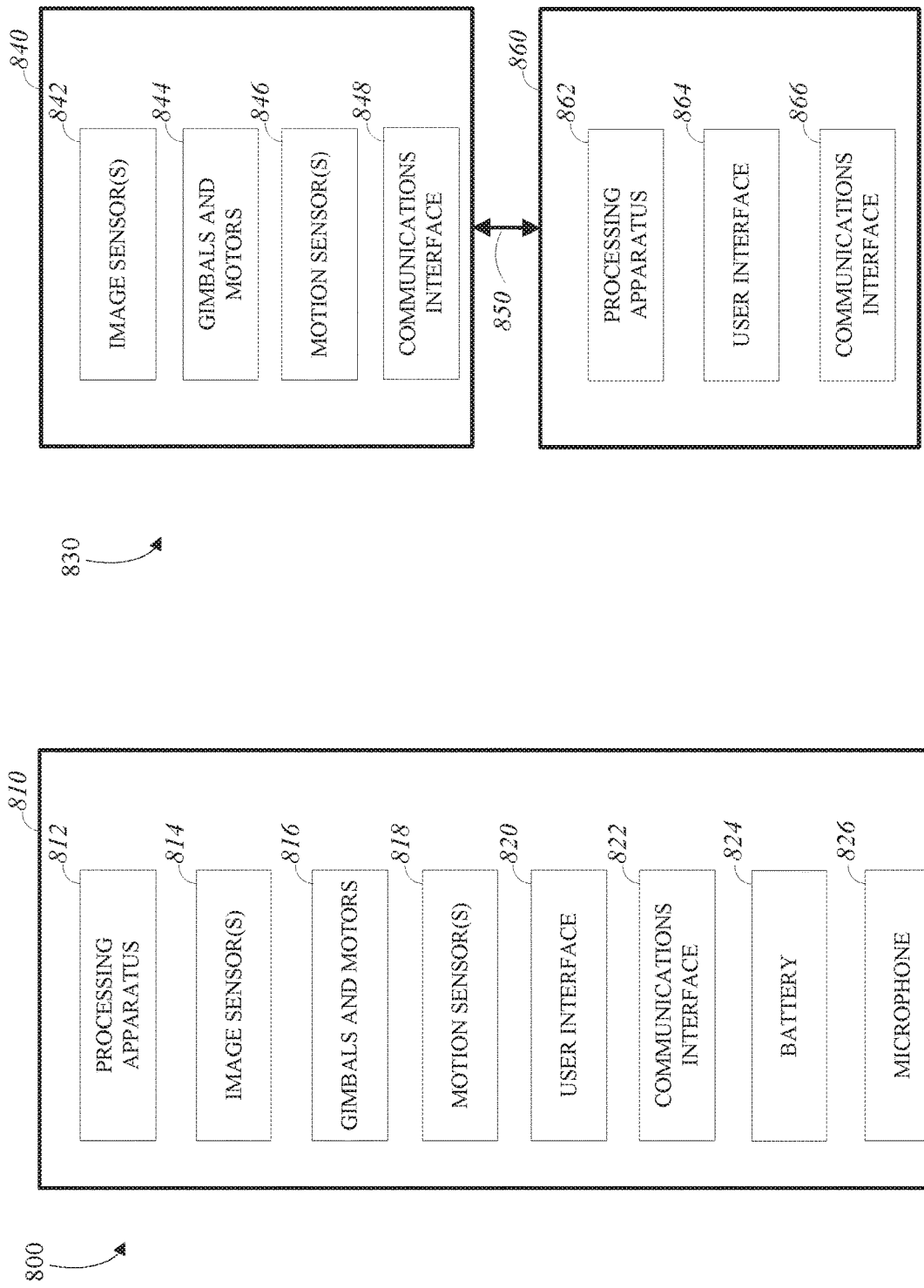

REDUCTION OF MICROPHONE AUDIO NOISE FROM GIMBAL MOTOR

TECHNICAL FIELD

This disclosure relates to modular image capture systems.

BACKGROUND

Image capture devices, such as cameras, may capture content such as images or video. Drones have been used to carry cameras and to enable capture of images from the air. Drones with attached cameras are typically controlled by controllers via a wireless communications link. Mechanical stabilization systems (e.g., gimbals and motors) have been used with drone-based cameras to reduce distortion or shakiness of captured images that can be caused by vibrations and other motions of a drone during capture.

SUMMARY

Disclosed herein are implementations of modular image capture systems configured to reduce unwanted noise during image capture. In a first aspect, the subject matter described in this specification may be embodied in systems that include an image capture module that includes an image sensor to capture images; an integrated mechanical stabilization system that includes one or more motors, each used to control an orientation of the image sensor; an accelerometer that detects vibrations from the one or more motors; and a microphone that receives an intended sound and noise from the motor. The noise from the motor may include audible noise and vibration noise. The image capture module may also include a processor to control the motor and generate a motor control signal, and a noise estimator model that includes an estimator portion and a model generator portion. The estimator portion may be a sound pressure level (SPL) estimator and the model generator portion may be an SPL model generator.

The SPL estimator may receive a microphone signal, the motor control signal, and/or an accelerometer signal. The SPL estimator may generate one or more model parameters based on a transfer function of the microphone signal, the motor control signal, and/or the accelerometer signal.

The SPL model generator may receive the motor control signal, the accelerometer signal, and/or the model parameter. The SPL model generator may generate a sound estimate based on the one or more model parameters and the transfer functions of the motor control signal and/or the accelerometer signal.

The image capture module may include a noise suppressor that receives the microphone signal and the sound estimate. The noise suppressor may process the microphone signal to reduce the noise from the motor. In one example, the noise suppressor may process the microphone signal by inverting the sound estimate and subtracting the inverted sound estimate from the microphone signal. The noise suppressor may transmit feedback to the SPL estimator. The feedback may include an indicator to update one or more model parameters. In some embodiments, the noise suppressor may transmit feedback to the SPL estimator, where the feedback may include an indicator to stop performing estimates.

In a second aspect, an image capture module may include an image sensor to capture images and an accelerometer to detect a vibration and generate an accelerometer signal. The vibration may produce a vibration noise. The image capture module may also include a microphone to detect and receive an intended sound. The microphone may also detect and receive the vibration noise as an unintended or unwanted sound.

The image capture module may include a noise estimator model that includes a model estimator, a model, and a model estimator update control. The model estimator may receive a microphone signal and/or the accelerometer signal. The model estimator may generate one or more model parameters based on a transfer function of the microphone signal and/or the accelerometer signal.

The model may receive the accelerometer signal. The model may generate a sound estimate based on the one or more model parameters and the transfer function of the accelerometer signal.

The image capture module may include a noise suppressor that receives the microphone signal and the sound estimate. The noise suppressor may process the microphone signal to reduce the vibration noise. For example, the noise suppressor may invert the sound estimate and subtract the inverted sound estimate from the microphone signal.

The noise suppressor may transmit feedback to the model estimator update control. The model estimator update control may determine whether to update one or more model parameters. The determination of whether to update one or more model parameters may be based on the sound estimate and the microphone signal. The model estimator may receive, from the model estimator update control, a control signal that indicates a model parameter update. The model estimator may perform the model parameter update based on the control signal. In some embodiments, the model estimator update control may transmit feedback to the model estimator, where the feedback may include an indicator to stop performing estimates.

In a first aspect, the subject matter described in this specification can be embodied in systems that include an image capture module including an image sensor configured to capture images, a connector, and an integrated mechanical stabilization system configured to control an orientation of the image sensor relative to the connector; an aerial vehicle configured to be removably attached to the image capture module by the connector and to fly while carrying the image capture module; and a handheld module configured to be removably attached to the image capture module by the connector, wherein the handheld module includes a battery and an integrated display configured to display images received from the image sensor.

In a second aspect, the subject matter described in this specification can be embodied in methods that include connecting an image capture module, which includes an image sensor and an integrated mechanical stabilization system, to an aerial vehicle; flying the aerial vehicle with the image capture module attached to the aerial vehicle and capturing a first image with the image sensor while flying; disconnecting the image capture module from the aerial vehicle; connecting the image capture module to a handheld module, which includes a battery and an integrated display; and capturing a second image with the image sensor while the image capture module is attached to the handheld module and drawing power from the battery.

In a third aspect, the subject matter described in this specification can be embodied in image capture modules that include an image sensor configured to capture images; a mechanical stabilization system, including gimbals and motors, that is integrated with the image sensor in the image capture module and configured to control an orientation of the image sensor; and a connector configured to interchangeably connect the mechanical stabilization system to an aerial vehicle in a first usage scenario and a handheld module in a second usage scenario, wherein a gimbal of the mechanical stabilization system is substantially flush with a surface of the connector.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings.

FIG. 8A is a block diagram of an example of a system configured for image capture.

FIG. 8B is a block diagram of an example of a system configured for image capture.

DETAILED DESCRIPTION

Figure 1A:
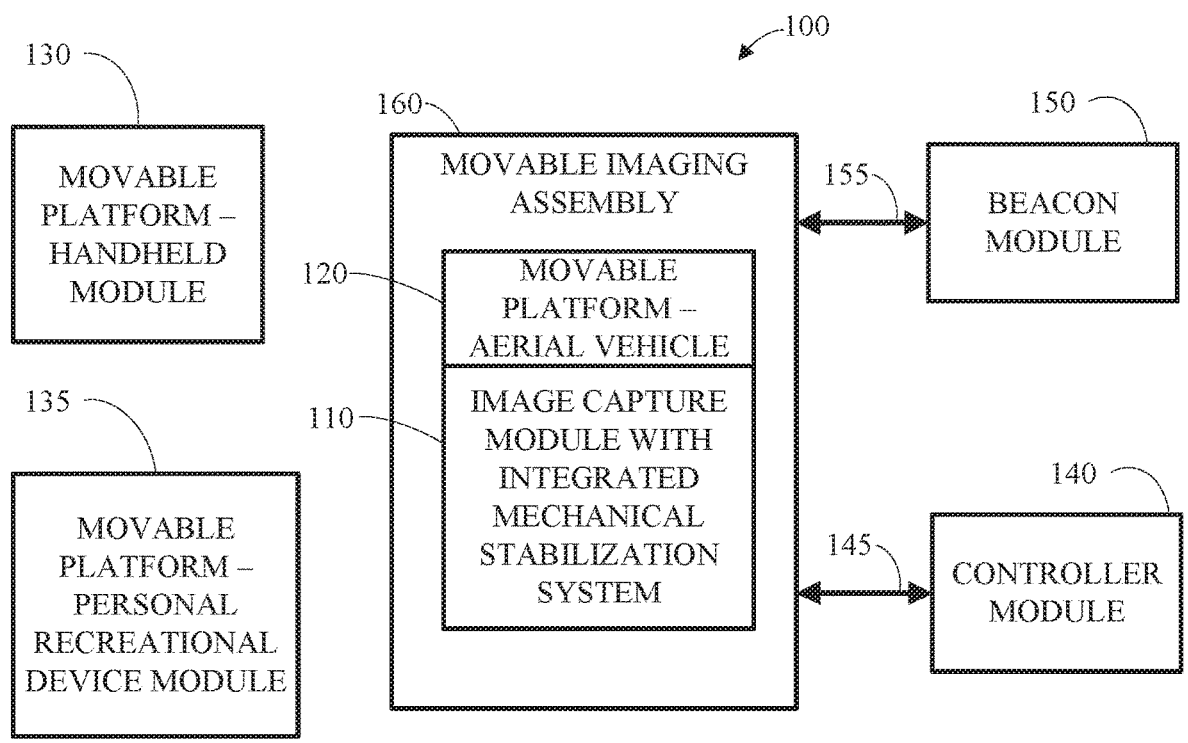
FIG. 1A is a block diagram of an example of a movable imaging system with modular components in a first usage scenario.

This document includes disclosure of modular image capture systems and techniques for image capture. An image capture module is described that includes an image sensor, a mechanical stabilization system (e.g., including gimbals and motors) that is integrated with the image sensor in the image capture module and configured to control an orientation of the image sensor, and a connector configured to interchangeably connect the mechanical stabilization system to an aerial vehicle, a handheld module, or any type of fixed or personal recreational device. A fixed mount may include any mount that may be attached to a wall, fence, building, and/or any fixed structure. A personal recreational device may include a bicycle, motorcycle, automobile, boat, recreational vehicle, helmet, surfboard, jet ski, snowboard, ski, and/or any type of device to which an imaging device may be mounted. The image capture module may be easily connected to different movable platforms, including the aerial vehicle, the handheld module, or personal recreational device, to suit different circumstances and usage scenarios. By integrating the mechanical stabilization system in the image capture module, a more reliable and lightweight attachment is provided between the mechanical stabilization system and the image sensor as compared to systems with a separable mechanical stabilization system.

Including a microphone in the same device as or attached to a motorized gimbal may lead to noise from the motor being detected by the microphone. The noise may be airborne or structure-borne. For example, airborne sound may be sound that is emitted from the motor into the air, which is then detected by the microphone along with the desired sound. Structure-borne noise may include vibrations from the motor that reach the microphone. Structure-borne noise may lead to local acoustic pressure variation by the microphone or pure vibration of the microphone.

The proposed systems and methods may offer advantages over conventional integrated image capture systems. For example, the impact of the motor induced noise may be predicted and reduced using known entities of the motor operation in adaptive noise suppression algorithms on the captured microphone signal. Some examples may use information associated with a motor control signal and/or information associated with an accelerometer to predict and reduce airborne and/or structure-borne noise from a microphone signal.

Implementations are described in detail with reference to the drawings, which are provided as examples to enable those skilled in the art to practice the technology. The figures and examples are not meant to limit the scope of the present disclosure to a single implementation or embodiment, and other implementations and embodiments are possible by way of interchange of, combination with, and/or removal of some or all of the described or illustrated elements. Wherever convenient, the same reference numbers will be used throughout the drawings to refer to same or like parts.

FIG. 1A is a block diagram of an example of a movable imaging system 100 with modular components in a first usage scenario. The movable imaging system 100 includes an image capture module 110 with an integrated mechanical stabilization system, an aerial vehicle 120, a handheld module 130, a personal recreational device module 135, a controller module 140, and a beacon module 150. The image capture module 110 includes a connector that enables the aerial vehicle 120, the handheld module 130, and the personal recreational device module 135 to be removably attached to the image capture module 110 as movable platforms for image capture in different usage scenarios. The connector may be mechanical and/or electrical. In this first usage scenario of FIG. 1A, the aerial vehicle 120 is attached to the image capture module 110 to form a movable imaging assembly 160 that may be used to capture images (e.g., still images or video) while the movable imaging assembly 160 moves in response to signals from the controller module 140 and/or the beacon module 150. In this first usage scenario of FIG. 1A, the handheld module 130 and the personal recreational device module 135 are disconnected from the image capture module 110.

The image capture module 110 includes an image sensor configured to capture images, a connector, and an integrated mechanical stabilization system configured to control an orientation of the image sensor relative to the connector. For example, the image capture module 110 may be the image capture module 200 of FIG. 2. The mechanical stabilization system is integrated in the sense that it is a part of the image capture module 110 that cannot be easily removed without the use of tools or damaging the image capture module 110. For example, the mechanical stabilization system may include gimbals (e.g., three gimbals) and motors that are configured to control an orientation of the image sensor relative to the connector. The mechanical stabilization system may enable capture of high quality images with low blur and/or reduced shaking or other motion between images in a sequence of images (e.g., frames of video). In some implementations, the mechanical stabilization system enables or improves subject tracking functions, in which a position and/or orientation of the image sensor is actively controlled to follow an object (e.g., a person) appearing in a field of view of the image sensor. Having the mechanical stabilization system integrated avoids the use of a potentially unreliable connection between the mechanical stabilization system and the image sensor and can reduce the size and weight of the materials used to attach the mechanical stabilization system to the image sensor. Size and weight are generally important considerations in electronics, but they may be particularly significant in applications, like the first usage scenario of FIG. 1A, where the image capture module 110 including the image sensor and the mechanical stabilization system will be carried by the aerial vehicle 120. Reducing the weight of the movable imaging assembly 160 may serve to decrease power consumption to increase battery time. Reducing the weight of the movable imaging assembly 160 may also enable compliance with safety regulations applicable to the operation of the aerial vehicle 120 that limit the weight of aerial vehicles.

The connector may be male or female. For example, the connector of the image capture module 110 may be keyed to a slot of the aerial vehicle 120, keyed to a slot of the handheld module 130, and keyed to a slot of the personal recreational device module 135. The connector may be keyed by virtue of the shape of an outer surface of the connector, which is fitted to the corresponding shape of the slot in the aerial vehicle 120, the corresponding shape in the slot of the handheld module 130, and the corresponding shape in the slot of the personal recreational device module 135. The keyed shape of the connector may include some asymmetry, which may facilitate easy connection of the aerial vehicle 120, the handheld module 130, and the personal recreational device module 135 to the image capture module 110 by preventing a user from accidentally inserting the connector in an improper orientation. In some implementations, the connector includes one or more fastening mechanisms (e.g., latches) for securing a connection. The connector may include an electrical connector (e.g., a universal serial bus (USB) type C connector) nested inside of the keyed outer portion of the connector. The electrical connector may include multiple conductors that may be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110. In some implementations, the connector lacks conductors for the transfer of data and/or power between the image capture module 110 and an attached movable platform (e.g., the aerial vehicle 120 in this first usage scenario). Power and/or data may be transferred wirelessly at short range between the image capture module 110 and an attached movable platform. For example, the connector may include an interface for establishing a short-range, high-speed wireless link (e.g., employing technology promoted by Keyssa, Inc., which may be referred to as "Kiss Connectivity") for transferring data at suitable video capture data rates between the image capture module 110 and an attached movable platform. For example, the connector may include an interface (e.g., wireless charging interface or a near-field communications interface) for inductively coupling power between the image capture module 110 and an attached movable platform. In some implementations, having a connector with fewer or no conductors may result in a more durable or reliable connector.

The image sensor of the image capture module 110 is configured to capture images (e.g., still images or frames of video). The image sensor may be configured to detect light of a certain spectrum (e.g., the visible spectrum or the infrared spectrum) and convey information constituting an image as electrical signals (e.g., analog or digital signals). For example, the image sensor may include charge-coupled devices (CCD) or active pixel sensors in complementary metal-oxide-semiconductor (CMOS). The image sensor may include an analog-to-digital converter and output digital image data. The image sensor may detect light incident through a lens (e.g., a rectilinear lens or a fisheye lens). In some implementations, the image capture module 110 includes multiple image sensors that have respective fields of view that overlap, and images captured by these image sensors may be stitched together to generate composite images (e.g., panoramic images).

The movable imaging system 100 includes an aerial vehicle 120 (e.g., a drone) configured to be removably attached to the image capture module 110 by the connector and to fly while carrying the image capture module 110. The aerial vehicle 120 may be removably attached in the sense that a user can quickly connect and disconnect the aerial vehicle 120 from the image capture module 110 without using a tool (e.g., by engaging or disengaging one or more latches, rotary-type mechanisms, or click-type mechanisms using fingers). The aerial vehicle 120 may include a slot that is fitted to the connector of the image capture module 110, in which the connector may be inserted. For example, the aerial vehicle 120 may include an electrical connector (e.g., a USB type C connector) nested in the slot that includes multiple conductors configured to transfer images and other data and control signals between the aerial vehicle 120 and the image capture module 110 when they are connected to form the movable imaging assembly 160. The nested electrical connector may further secure or guide the image capture module 110 into within the slot of the aerial vehicle 120. For example, the aerial vehicle 120 may be a quadcopter. In the first usage scenario of FIG. 1A, the aerial vehicle 120 is connected to the image capture module 110.

The movable imaging system 100 includes a beacon module 150 configured to wirelessly transmit position data to the aerial vehicle 120 to enable the aerial vehicle 120 to follow the beacon module 150. The position data may be transmitted via a wireless link 155. For example, the beacon module 150 may include a global positioning system (GPS) receiver, and the position data may include GPS coordinates of the beacon module 150. In some implementations, the beacon module 150 includes an inertial measurement unit (e.g., including accelerometers, gyroscopes, and/or magnetometers), and the position data includes changes in the position and/or orientation of the beacon module 150 that are sensed by the inertial measurement unit. For example, the wireless link 155 may utilize a wireless interface standard, such as Wi-Fi, Bluetooth (BT), cellular data link, ZigBee, ANT+ link, or other wireless protocols. In some implementations, the aerial vehicle 120 is configured to follow a user based on position data from the beacon module 150 and based on computer vision tracking of the user in images from the image capture module. For example, quadratic estimation techniques (e.g., a Kalman filter) may be used to fuse position data from the beacon module 150 with computer vision features to estimate the position of a user holding or wearing the beacon module 150, and the position and/or orientation of the aerial vehicle 120 and the image sensor of the attached image capture module 110 may be controlled based on the estimate of the position of the user. For example, this control of the image sensor field of view may be actuated using the control surfaces (e.g., propellers) of the aerial vehicle 120 and/or the mechanical stabilization system (e.g., gimbals) of the image capture module 110. In some implementations, the beacon module 150 includes a user interface (e.g., including buttons and a display) that allows a user holding the beacon module 150 to issue commands to the movable imaging assembly 160 via the wireless link 155. For example, a user may issue commands to cause the movable imaging assembly 160 to follow the user, to pause following the user and hover in place, or to take off or land.

The movable imaging system 100 includes a controller module 140 configured to wirelessly communicate with the aerial vehicle 120 to control motion of the aerial vehicle 120 and capture of images using the image sensor while the image capture module 110 is attached to the aerial vehicle 120. The controller module 140 includes a user interface (e.g., joysticks, buttons, and/or a touchscreen display) that allows a user to enter commands to control motion of the movable imaging assembly 160 and the capture of images. Information (e.g., control signals and/or image data) may be transferred between the movable imaging assembly 160 and the controller module via the wireless link 145. For example, the wireless link 145 may utilize a wireless interface standard, such as Wi-Fi, Bluetooth (BT), cellular data link, ZigBee, ANT+ link, or other wireless protocols. For example, images (e.g., still images or video at full resolution or at reduced resolution) captured by the movable imaging assembly 160 may be received by the controller module 140 and displayed on a touchscreen display to the user. In some implementations, the aerial vehicle 120 is configured to communicate wirelessly with both the beacon module 150 and the controller module 140. Communicating with both the beacon module 150 and the controller module 140 may allow a first user to actively monitor and/or control image capture of the images by the movable imaging assembly 160 from the controller module 140 while the movable imaging assembly 160 follows a second user or other object that is bearing the beacon module 150 passively while moving. This may enhance hands-free following of a subject and enable following objects (e.g., a dog or a car) that are unable to issue commands to the movable imaging assembly 160 or make the experience of being followed more natural and less mentally taxing for the second user, so that the second user can focus their attention on other activities (e.g., running, celebrating, soccer, skateboarding, motocross, surfing, snowboarding). The first user can focus on optimizing other aspects of image capture (e.g., choosing perspective on the subject, zooming, or timing snaps of still images) while the autonomous functions of the aerial vehicle 120 handle the following and navigation tasks.

Figure 1B:
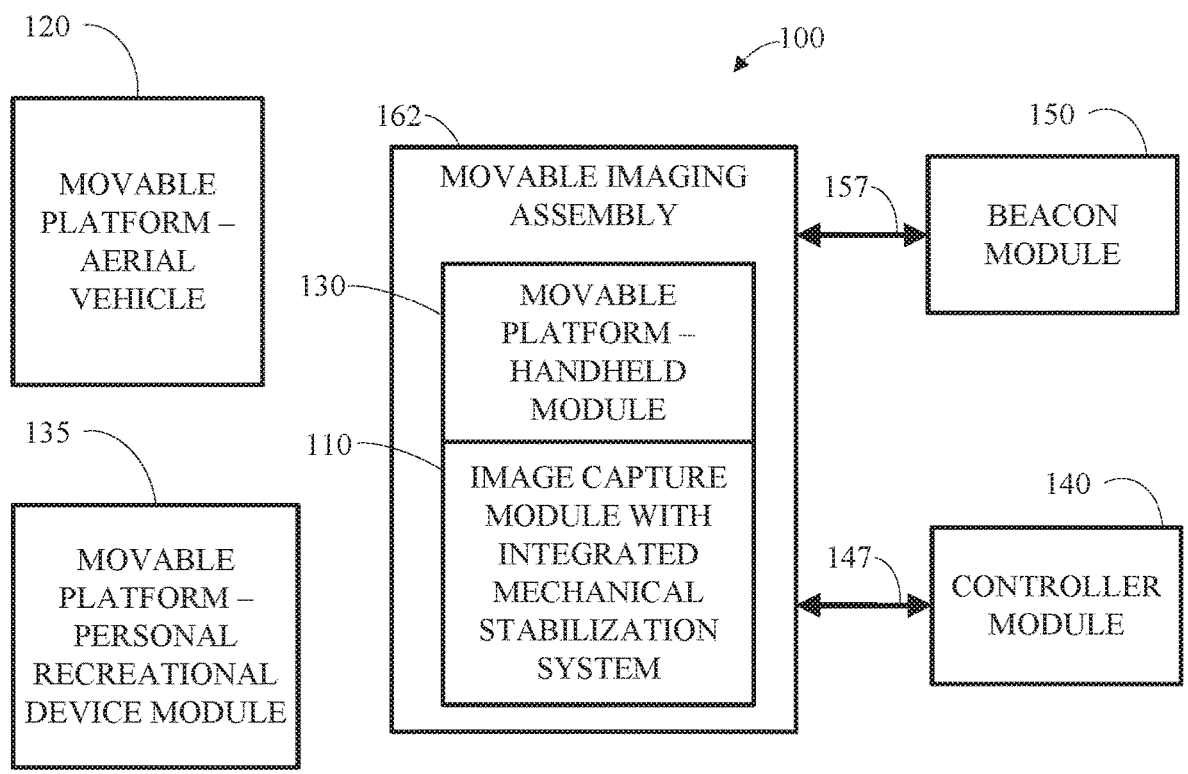
FIG. 1B is a block diagram of an example of a movable imaging system with modular components in a second usage scenario.

FIG. 1B is a block diagram of the movable imaging system 100 with modular components in a second usage scenario. In this second usage scenario of FIG. 1B, the handheld module 130 is attached to the image capture module 110 to form a movable imaging assembly 162 that may be used to capture images (e.g., still images or video) while the movable imaging assembly 162 moves in the hand of a user and/or in response to signals from the controller module 140 and/or the beacon module 150. In this second usage scenario of FIG. 1B, the aerial vehicle 120 and the personal recreational device module 135 are disconnected from the image capture module 110.

The movable imaging system 100 includes a handheld module 130 configured to be removably attached to the image capture module 110 by the connector. In some implementations, the handheld module 130 includes a battery and an integrated display configured to display images received from the image sensor (e.g., received via conductors of the connector or a short-range-high, high-speed wireless link). The handheld module 130 may be removably attached in the sense that a user can quickly connect and disconnect the handheld module 130 from the image capture module 110 without using a tool (e.g., by engaging or disengaging one or more latches, rotary-type mechanisms, or click-type mechanisms using fingers). In the second usage scenario of FIG. 1B, the handheld module 130 is connected to the image capture module 110.

The handheld module 130 may include a slot that is fitted to the connector of the image capture module 110, in which the connector may be inserted. For example, the handheld module 130 may include an electrical connector (e.g., a USB type C connector) nested in the slot that includes multiple conductors configured to transfer images and other data and control signals between the handheld module 130 and the image capture module 110 when they are connected to form the movable imaging assembly 162. The nested electrical connector may further secure or guide the image capture module 110 into within the slot of the handheld module 130. The slot of the handheld module 130 may include one or more fastening mechanisms configured to secure the attachment of the handheld module 130 to the connector during the second usage scenario of FIG. 1B. In some implementations, the handheld module 130 includes a first fastening mechanism and a second fastening mechanism (e.g., latches, clasps, or rotating mechanisms) configured to secure the connector when the image capture module is attached to the handheld module. The fastening mechanisms may be positioned such that either of the first fastening mechanism or the second fastening mechanism is sufficient to secure the connector. In some implementations, a gimbal (e.g., a roll gimbal) of the mechanical stabilization system is substantially flush with a surface of the handheld module 130 when the image capture module is attached to the handheld module 130.

In the second usage scenario of FIG. 1B, for example, the movable imaging assembly 162 may be carried in a hand of a user who is able to point the image sensor at subjects for image capture and control image capture through a user interface (e.g., buttons and/or a touchscreen) of the handheld module 130. The user may view or preview captured images on a display of the handheld module 130. The battery of the handheld module 130 may provide power to the image capture module 110 during the second usage scenario.

The movable imaging assembly 162 may be controlled by the controller module 140 and/or the beacon module 150 while mounted to adjust an orientation of the image sensor using the mechanical stabilization system (e.g., three gimbals and motors) and control other image capture features (e.g., snap a still image or adjust exposure time). Information (e.g., control signals and/or image data) may be transferred between the movable imaging assembly 162 and the controller module via the wireless link 147. For example, the wireless link 147 may utilize a wireless interface standard, such as Wi-Fi, Bluetooth (BT), cellular data link, ZigBee, ANT+ link, or other wireless protocols. For example, images (e.g., still images or video at full resolution or at reduced resolution) captured by the movable imaging assembly 162 may be received by the controller module 140 and displayed on a touchscreen display to the user. The movable imaging assembly 162 may wirelessly receive position data from the beacon module 150 to enable the image sensor to follow the beacon module 150 by adjusting the orientation of the image sensor using the mechanical stabilization system. The position data may be received via a wireless link 157. For example, the wireless link 157 may utilize a wireless interface standard, such as Wi-Fi, Bluetooth (BT), cellular data link, ZigBee, ANT+ link, or other wireless protocols. In some implementations, the movable imaging assembly 162 is configured to communicate wirelessly with both the beacon module 150 and the controller module 140 to enable following of a subject with the beacon module 150 with some supervision from a user of the controller module 140.

Figure 1C:
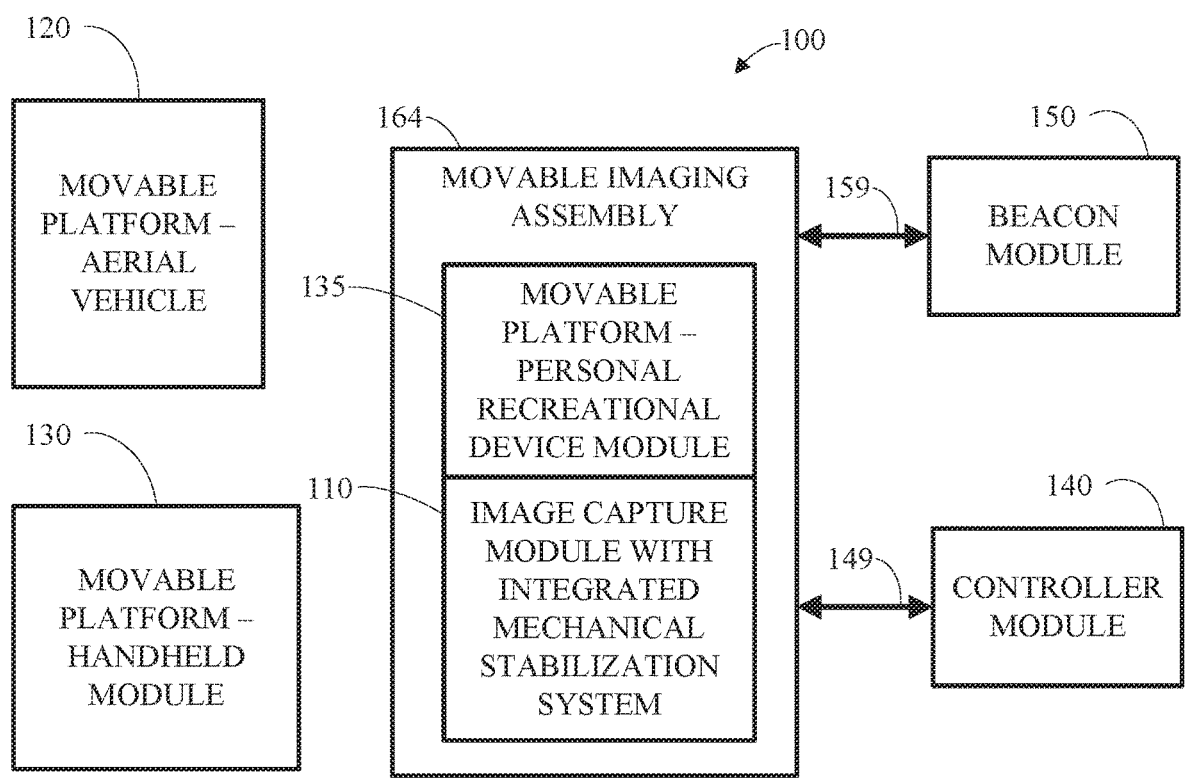
FIG. 1C is a block diagram of an example of a movable imaging system with modular components in a third usage scenario.

FIG. 1C is a block diagram of the movable imaging system 100 with modular components in a third usage scenario. In the third usage scenario of FIG. 1C, for example, the movable imaging assembly 164 may be mounted on a person or an object using a fastening article (e.g., a strap or helmet mount). In some embodiments, a skier may wear a strap or vest with a portion configured to hold the movable imaging assembly 164 in place on a portion of the skier's body (e.g., on the arm or chest) to capture images from their perspective as they move with their hands free down a slope. In some embodiments, the movable imaging assembly 164 may be positioned or mounted on the personal recreational device (in this example, the ski). In some embodiments, the movable imaging assembly 164 may be positioned or mounted in a fixed location (e.g., on a tree branch or resting on the surface of a table). In this third usage scenario of FIG. 1C, the personal recreational device module 135 is attached to the image capture module 110 to form a movable imaging assembly 164 that may be used to capture images (e.g., still images or video) while the movable imaging assembly 164 moves in response to signals from the controller module 140 and/or the beacon module 150. In this third usage scenario of FIG. 1C, the aerial vehicle 120 and the handheld module 130 are disconnected from the image capture module 110.

The movable imaging system 100 includes a personal recreational device module 135 configured to be removably attached to the image capture module 110 by the connector. In some implementations, the personal recreational device module 135 includes a battery and an integrated display configured to display images received from the image sensor (e.g., received via conductors of the connector or a short-range-high, high-speed wireless link). The personal recreational device module 135 may be removably attached in the sense that a user can quickly connect and disconnect the personal recreational device module 135 from the image capture module 110 without using a tool (e.g., by engaging or disengaging one or more latches, rotary-type mechanisms, or click-type mechanisms using fingers). In the third usage scenario of FIG. 1C, the personal recreational device module 135 is connected to the image capture module 110.

The personal recreational device module 135 may include a slot that is fitted to the connector of the image capture module 110, in which the connector may be inserted. For example, the personal recreational device module 135 may include an electrical connector (e.g., a USB type C connector) nested in the slot that includes multiple conductors configured to transfer images and other data and control signals between the personal recreational device module 135 and the image capture module 110 when they are connected to form the movable imaging assembly 164. The nested electrical connector may further secure or guide the image capture module 110 into within the slot of the personal recreational device module 135. The slot of the personal recreational device module 135 may include one or more fastening mechanisms configured to secure the attachment of the personal recreational device module 135 to the connector during the third usage scenario of FIG. 1C. In some implementations, the personal recreational device module 135 includes a first fastening mechanism and a second fastening mechanism (e.g., latches, clasps, or rotating mechanisms) configured to secure the connector when the image capture module 110 is attached to the personal recreational device module 135. The fastening mechanisms may be positioned such that either of the first fastening mechanism or the second fastening mechanism is sufficient to secure the connector. In some implementations, a gimbal (e.g., a roll gimbal) of the mechanical stabilization system is substantially flush with a surface of the personal recreational device module 135 when the image capture module is attached to the personal recreational device module 135.

The movable imaging assembly 164 may be controlled by the controller module 140 and/or the beacon module 150 while mounted to adjust an orientation of the image sensor using the mechanical stabilization system (e.g., three gimbals and motors) and control other image capture features (e.g., snap a still image or adjust exposure time). Information (e.g., control signals and/or image data) may be transferred between the movable imaging assembly 164 and the controller module via the wireless link 149. For example, the wireless link 149 may utilize a wireless interface standard, such as Wi-Fi, Bluetooth (BT), cellular data link, ZigBee, ANT+ link, or other wireless protocols. For example, images (e.g., still images or video at full resolution or at reduced resolution) captured by the movable imaging assembly 164 may be received by the controller module 140 and displayed on a touchscreen display to the user. The movable imaging assembly 164 may wirelessly receive position data from the beacon module 150 to enable the image sensor to follow the beacon module 150 by adjusting the orientation of the image sensor using the mechanical stabilization system. The position data may be received via a wireless link 159. For example, the wireless link 159 may utilize a wireless interface standard, such as Wi-Fi, Bluetooth (BT), cellular data link, ZigBee, ANT+ link, or other wireless protocols. In some implementations, the movable imaging assembly 164 is configured to communicate wirelessly with both the beacon module 150 and the controller module 140 to enable following of a subject with the beacon module 150 with some supervision from a user of the controller module 140.

Although not explicitly shown in FIGS. 1A, 1B, and 1C, the movable imaging system 100 may include additional components to facilitate image capture under diverse and potentially motion-intensive circumstances. For example, the movable imaging system 100 may include a detachable flight battery for powering the aerial vehicle 120 and an AC charger for quickly charging the flight battery between flights in the first usage scenario. In some implementations, multiple detachable flight batteries are included in the movable imaging system 100 to continue use while a detachable flight battery is charging. For example, the movable imaging system 100 may include an AC charger for quickly charging the handheld module 130. For example, the movable imaging system 100 may include a mounting device (e.g., a strap, helmet mount, or mini tripod or wide base) for the handheld module 130. For example, the movable imaging system 100 may include one or more carrying cases for components of the movable imaging system 100. For example, the movable imaging system 100 may include cables (e.g., a USB type C cable and an HDMI cable) that can be used to connect a personal computing device (e.g., a smartphone, a tablet, or a laptop) to the image capture module 110, the aerial vehicle 120, and/or the handheld module 130 to perform bulk transfers of data (e.g., image data) and/or update software running on a processing apparatus of these components of the movable imaging system 100. An application may be installed on one or more external computing devices (e.g., a smartphone, a tablet, or a laptop) to facilitate pulling and sharing captured video content from the image capture module 110 and facilitating software upgrades to the image capture module 110, the aerial vehicle 120, the handheld module 130, and/or the controller module 140. The one or more external computing devices may communicate with the image capture module 110 via a wireless communications link or a wired communications link (e.g., an HDMI link). The application running on the external computing device may be configured to perform a variety of operations related to camera configuration, control of video acquisition, and/or display of video captured by the image capture module 110. An application (e.g., GoPro App) may enable a user to create short video clips and share video clips to a cloud service (e.g., cloud services commercially available from Instagram, Facebook, YouTube, or Dropbox); perform remote control of functions of the image capture module 110; live preview video being captured for shot framing; mark key moments while recording (e.g., HiLight Tag, View HiLight Tags in GoPro Camera Roll) for location and/or playback of video highlights; wirelessly control camera software; and/or perform other functions.

There may be multiple microphones positioned on the modular components of the movable imaging system 100. For example, an image capture module 110 may include two microphones positioned to facilitate the capture of stereo sound. For example, a single microphone may be included in the handheld module 130 (e.g., positioned on or near a side of the handheld module 130 that includes a display). The microphone of the handheld module 130 may be used to enable the suppression of wind noise and/or gimbal motor noise. Having microphones on the image capture module 110 and the handheld module 130 may provide for diverse, well-spaced microphone locations on the movable imaging assembly 162, which may enable or improve noise suppression functions. A microphone located on the side of the handheld module 130 with the display may facilitate recording video with sound in a selfie use case for the movable imaging assembly 162. Having a single microphone in the handheld module may also reduce battery draining. In some implementations, multiple microphones are included on the handheld module 130 (e.g., to support the capture of stereo sound).

In some implementations, the movable imaging system 100 includes additional movable platforms that are configured to be removably attached to the image capture module 110 by the connector. For example, additional aerial vehicles of different sizes and with different ranges may be included. For example, an automated or autonomous land-based movable vehicle (e.g., a remote-control car) may be included with the movable imaging system 100 to support image capture in different circumstances, such as during a road race.

In some implementations, the movable imaging system 100 includes additional image capture modules with a connector like the connector of the image capture module 110 that is compatible to be removably attached to the aerial vehicle 120, the handheld module 130, and the personal recreational device module 135. This may enable swapping out different versions of the image capture module 110 to tailor image capture capabilities to different usage scenarios. For example, some image capture modules may have only a single image sensor, while some image capture modules may have multiple image sensors and support panoramic image capture with stitching.

In some implementations, the handheld module 130 may be configured to control the movable imaging assembly 160 during the first usage scenario of FIG. 1A via wireless link. For example, the handheld module 130 may include hardware (e.g., a GPS receiver) and/or software to enable some or all of the functionality of the controller module 140 and/or the beacon module 150. For example, the handheld module 130 enables a user to issue a "follow-me" command to the movable imaging assembly 160 and transmit position data for the handheld module 130 to the movable imaging assembly 160 to cause the movable imaging assembly 160 to follow and capture images of a bearer of the handheld module. In some implementations (not shown), the controller module 140 and/or the beacon module 150 may be omitted from the movable imaging system 100.

In some implementations (not shown), a handheld module, with features similar to the handheld module 130, is integrated with an image capture module, with features similar to the image capture module 110, as a combined handheld image capture module. The combined handheld image capture module includes an image sensor, an integrated mechanical stabilization system configured to control an orientation of the image sensor, a display, a battery large enough to support operation similar to that described in the second usage scenario of FIG. 1B, and a connector configured to be removably attached to an aerial vehicle, which may be similar to the aerial vehicle 120, or another movable platform. For example, this aerial vehicle may include a hole or transparent panel in the bottom of the aerial vehicle through which the display and/or control interface of the combined handheld image capture module is visible and/or accessible while the combined handheld image capture module is attached to the aerial vehicle. For example, this accessible control interface may be used to control functions of the combined handheld image capture module and/or the aerial vehicle while they are attached. In some implementations, the display to the combined handheld image capture module may be powered down by default when the combined handheld image capture module is attached to the aerial vehicle or when in the air flying.

In some implementations (not shown), components and/or functionality of the controller module 140 and/or the beacon module 150 may be combined in a single device. The consolidation of these two devices may lessen the complexity, cost, and/or weight of the resulting movable imaging system with modular components.

In some implementations (not shown), a movable imaging system with modular components includes an image capture module without an integrated mechanical stabilization system that instead includes one or more modular mechanical stabilization systems (e.g., gimbals and motors) that are configured to be removably attached to the image capture module and multiple movable platforms. The one or more modular mechanical stabilization systems may be configured to control a relative orientation of an image sensor of the image capture module and a movable platform (e.g., an aerial vehicle or a handheld module) that is currently attached. For example, multiple modular mechanical stabilization systems may be included in this movable imaging system with different size, weight, and performance characteristics that are suited to different circumstances.

In some circumstances, it is desirable to track a target, which may include one or more subjects, with a movable imaging assembly (e.g., the movable imaging assembly 160 or the movable imaging assembly 162). Various forms of tracking may be utilized, including those discussed below and in U.S. Provisional Patent Application Ser. No. 62/364, 960, filed Jul. 21, 2016, and herein incorporated by reference in its entirety. A tracking system may be utilized to implement the described forms of tracking. The tracking system may comprise a processor and algorithms that are used for tracking the target. A tracking system may be included entirely within the movable imaging assembly (e.g., the movable imaging assembly 160 or the movable imaging assembly 162) or entirely within the controller module 140 or an external computing device (e.g., a smartphone, a tablet, or a laptop) in communication with the movable imaging assembly, or portions of a tracking system may be located or duplicated within a movable imaging assembly and the controller module 140 or an external computing device. A voice recognition system may also be utilized to interact with the tracking system and issue commands (e.g., commands identifying or adjusting a target).

Figure 2:
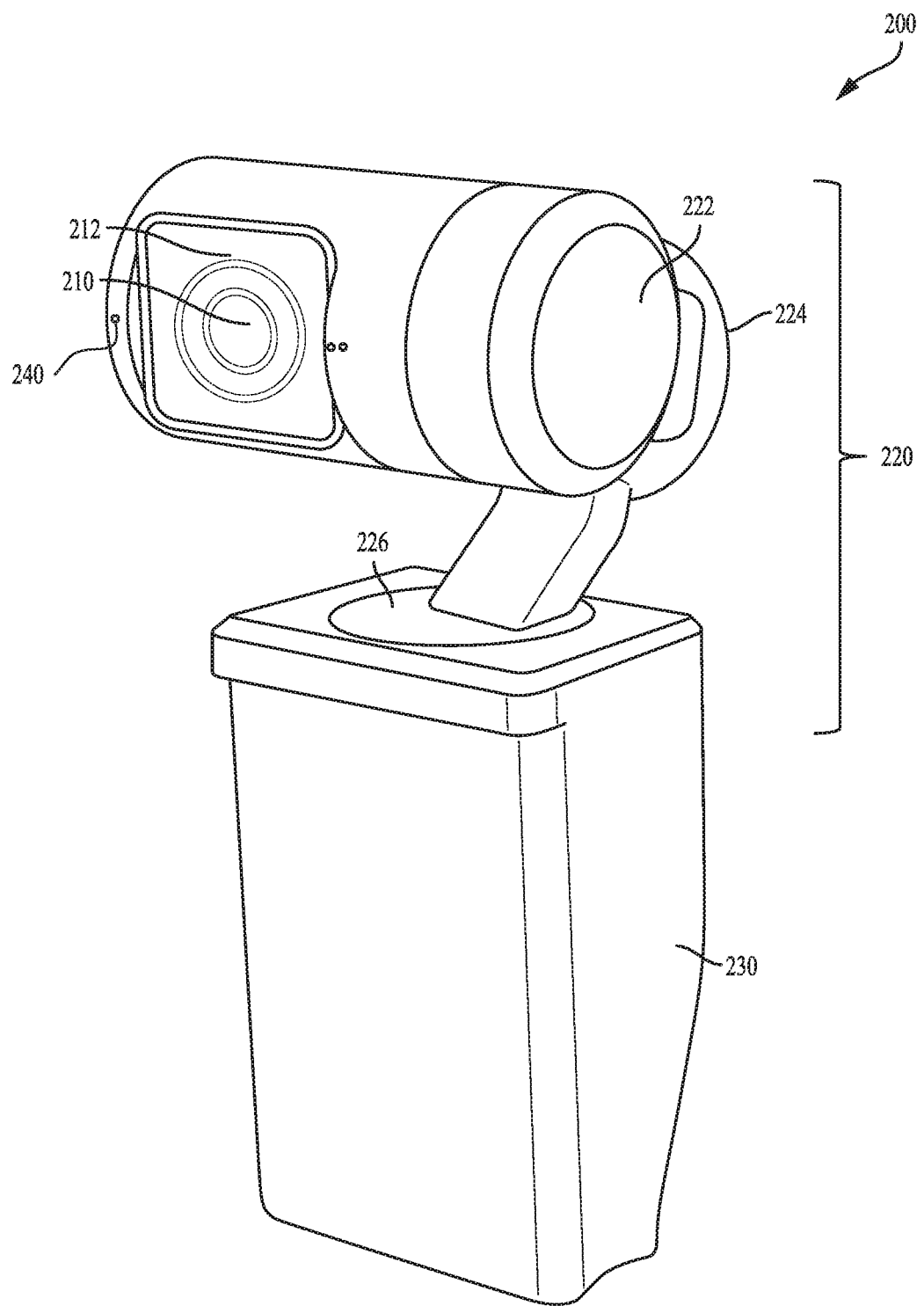
FIG. 2 is a pictorial illustration of an example of an image capture module from a first perspective.

FIG. 2 is a pictorial illustration of an example of an image capture module 200. The image capture module 200 includes an image sensor 210 configured to capture images; a mechanical stabilization system 220, including gimbals and motors (222, 224, and 226); a connector 230 configured to interchangeably connect the mechanical stabilization system to an aerial vehicle (e.g., the aerial vehicle 120), a handheld module (e.g., the handheld module 130), and a personal recreational device module (e.g., personal recreational device module 135); and one or more microphone(s) 240.

The image capture module 200 includes an image sensor 210 configured to capture images (e.g., still images or frames of video). The image sensor 210 may be configured to detect light of a certain spectrum (e.g., the visible spectrum or the infrared spectrum) and convey information constituting an image as electrical signals (e.g., analog or digital signals). For example, the image sensor 210 may include charge-coupled devices (CCD) or active pixel sensors in complementary metal-oxide-semiconductor (CMOS). The image capture module 200 includes a lens 212 (e.g., a wide-angle rectilinear lens). The image sensor 210 detects light from the environment that is incident through the lens 212.

The image capture module 200 may also include a processing apparatus (e.g., including memory, an image signal processor, a hardware encoder, a microcontroller, and/or other processor) that is configured to track a user based on position data from a beacon module (e.g., the beacon module 150) and/or based on computer vision tracking of the user in images from the image sensor 210 in a first usage scenario, where the image capture module 200 is attached to an aerial vehicle, and/or in a second usage scenario, where the image capture module 200 is attached to a handheld module, and/or in a third usage scenario, where the image capture module 200 is attached to a personal recreational device module (e.g., the personal recreational device module 135). In some implementations, the processing apparatus may be configured to perform image processing operations (e.g., correction of dead pixels, band processing, decoupling of vertical blanking, spatial noise reduction, temporal noise reduction, automatic white balance, global tone mapping, local tone mapping, lens distortion correction, electronic rolling shutter correction, electronic image stabilization, output projection, and/or encoding) on images captured by the image sensor 210. In some implementations, some or all of the image processing operations are performed on the images captured by the image sensor by a processing apparatus that is located in whole or in part in another component of a larger movable imaging system 100. For example, the processing apparatus may be located inside the connector 230 below the gimbal 226 of the mechanical stabilization system 220.

The image capture module 200 includes a mechanical stabilization system 220, including gimbals and motors (222, 224, and 226) (e.g., corresponding to pitch, yaw, and roll, respectively), that is integrated with the image sensor 210 in the image capture module 200 and configured to control an orientation of the image sensor 210. For example, the gimbals and motors (222, 224, and 226) may enable rotation of the image sensor with three degrees of freedom. In some implementations, the gimbals and motors (222, 224, and 226) respectively enable a wide range of rotation angles (e.g., up to 180 degrees, 270 degrees, or 360 degrees). A gimbal 226 of the mechanical stabilization system 220 is substantially flush with a surface of the connector 230, causing the mechanical stabilization system 220 to have a low profile and protect the gimbal 226 from damage. In some implementations, the gimbal 226 is contained entirely within a body of the connector 230, at or below the grade of an outer surface of the connector 230. For example, the mechanical stabilization system 220 may be controlled with a controller (e.g., a proportional integral derivative controller) based on target orientations determined by a processing apparatus based on image data from the image sensor 210, motion sensor data from a motion sensor in the image capture module 200 or moving platform (e.g., the aerial vehicle 120, the handheld module 130, or the personal recreational device module 135) to which the image capture module 200 is attached, and/or position data for a tracking target from a beacon (e.g., the beacon module 150).

The mechanical stabilization system 220 may be configured to enable an electronically actuated transport mode. When many 3-axis gimbals are powered off, they simply float around aimlessly and are cumbersome to put away or transport. In some implementations, the mechanical stabilization system 220 is configured to enable an electronically actuated transport mode in which: upon the occurrence of triggering event (e.g., a specialized user command or a command to power OFF the image capture module 200 or the mechanical stabilization system 220), each of the gimbals and motors (222, 224, and 226) are electronically controlled to assume a fold-flat position and maintain that position for a fixed time period (e.g., 10, 30, or 60 seconds), allowing the user to easily slip the image capture module 200 into a pocket, carrying case, backpack, or other container. After the fixed time period has expired, the mechanical stabilization system 220 will completely power OFF, allowing the gimbal arms to move freely, once in the desired transport location. In some implementations, this electronically actuated transport mode can be accompanied by a physical lock which is either integrated into the gimbal itself, or via an external means such as a bracket or carrying case. For example, the electronically actuated transport mode may be implemented using electronic motor position sensors, mechanical fold-flat ability (range-of-motion), and firmware control (e.g., implemented in a processing apparatus of the image capture module 200).

The image capture module 200 includes a connector 230 configured to interchangeably connect the mechanical stabilization system 220 to an aerial vehicle (e.g., the aerial vehicle 120) in a first usage scenario, a handheld module (e.g., the handheld module 130) in a second usage scenario, and a personal recreational device module (e.g., the personal recreational device module 135) in a third usage scenario. The connector may be keyed to a slot of the aerial vehicle, keyed to a slot of the handheld module, and keyed to a slot of the personal recreational device module. The connector 230 is keyed by virtue of the shape of an outer surface of the connector 230, which is fitted to the corresponding shape of the slot in the aerial vehicle (e.g., the aerial vehicle 120), the corresponding shape in the slot of the handheld module (e.g., the handheld module 130), and the corresponding shape in the slot of the personal recreational device module (e.g., the personal recreational device module 135). The keyed shape of the connector 230 includes some asymmetry (i.e., the rectangular cross-section of the connector 230 that narrows, sloping inward, about halfway down the connector 230 on one side), which may facilitate easy connection of the aerial vehicle, the handheld module, and the personal recreational device module to the image capture module 200 by preventing a user from accidentally inserting the connector 230 in an improper orientation. For example, the connector 230 may include a first fastening mechanism and a second fastening mechanism configured to secure the connector 230 when the image capture module 200 is attached to the handheld module. The fastening mechanisms may be configured such that either of the first fastening mechanism or the second fastening mechanism is sufficient to secure the connector 230. The connector 230 includes an electrical connector (e.g., a universal serial bus (USB) type C connector) nested inside of the keyed outer portion of the connector 230. The electrical connector may include multiple conductors that can be used to provide power from a movable platform (e.g., the aerial vehicle 120 or the handheld module 130) to the image capture module 200 and transfer communication signals (e.g., USB 2.0, USB 3.0, I2C, SPI, and/or MIPI signals) between the movable platform and the image capture module 200 when they are connected. In some implementations, the connector 230 includes pairs of conductors respectively used to transfer power to the image capture module 200, bulk transfer data from the image capture module 200, transfer control signals to the image capture module 200, and transfer real-time video data from the image capture module 200.

The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110.

In the example of FIG. 2, the gimbal 226 of the mechanical stabilization system 220 is substantially flush with a surface of the connector 230. The gimbal 226 may be protected by a body of the connector 230 to protect the gimbal from damage and/or the ingress of dust. For example, the gimbal 226 may be a roll gimbal and with a corresponding roll motor with a roll motor housing that is built into the housing of the connector 230 so that the roll motor housing sits below the grade of an outer surface of the connector 230 and is hidden and/or protected. This configuration may provide advantages over other mechanical stabilization systems with all of their gimbals exposed (e.g., three axis gimbals exposed, including a roll axis motor housing sitting on top of a main housing). For example, locating the gimbal 226 within the connector 230 and/or substantially flush with a surface of the connector 230 may reduce the amount of exposed gimbal parts, reduce the height of the gimbal above a main housing, and/or simplify the overall design by reducing the number of visible motor elements (e.g., from three gimbals two gimbals).

Figure 3:
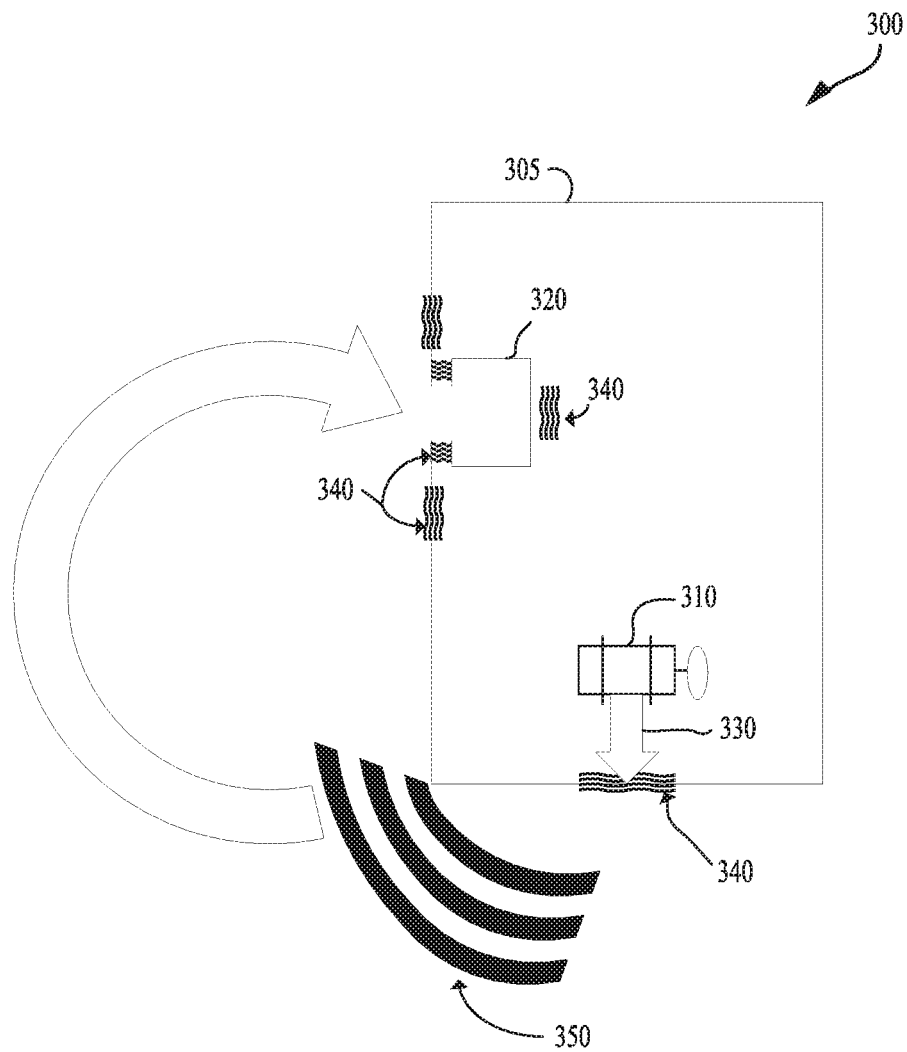
FIG. 3 is a diagram of an example of an image capture module showing interference from a motorized gimbal.

FIG. 3 is a diagram of an example of an image capture module 300 showing interference from an integrated motorized gimbal. In this example, the image capture module 300 includes a housing 305, a motor 310, and a microphone 320. It is understood that the image capture module may include any number of motors and any number of microphones, and that the motor 310 and microphone 320 are shown merely for simplicity.

As shown in FIG. 3, the motor 310 generates a force 330 during operation. The force 330 causes vibration 340 in the housing 305. The vibration 340 may travel to the microphone 320 via the housing 305, causing interference. The vibration 340 may travel internally or externally relative to the housing 305 and may be referred to as the vibration path. The interference caused by vibration 340 may be referred to as vibration interference.

As shown in FIG. 3, the motor 310 also generates an audible noise 350. This audible noise 350 is airborne and may be detected by the microphone 320 as acoustic interference. The path that the audible noise 350 travels may be referred to as the acoustic path.

Figure 4:
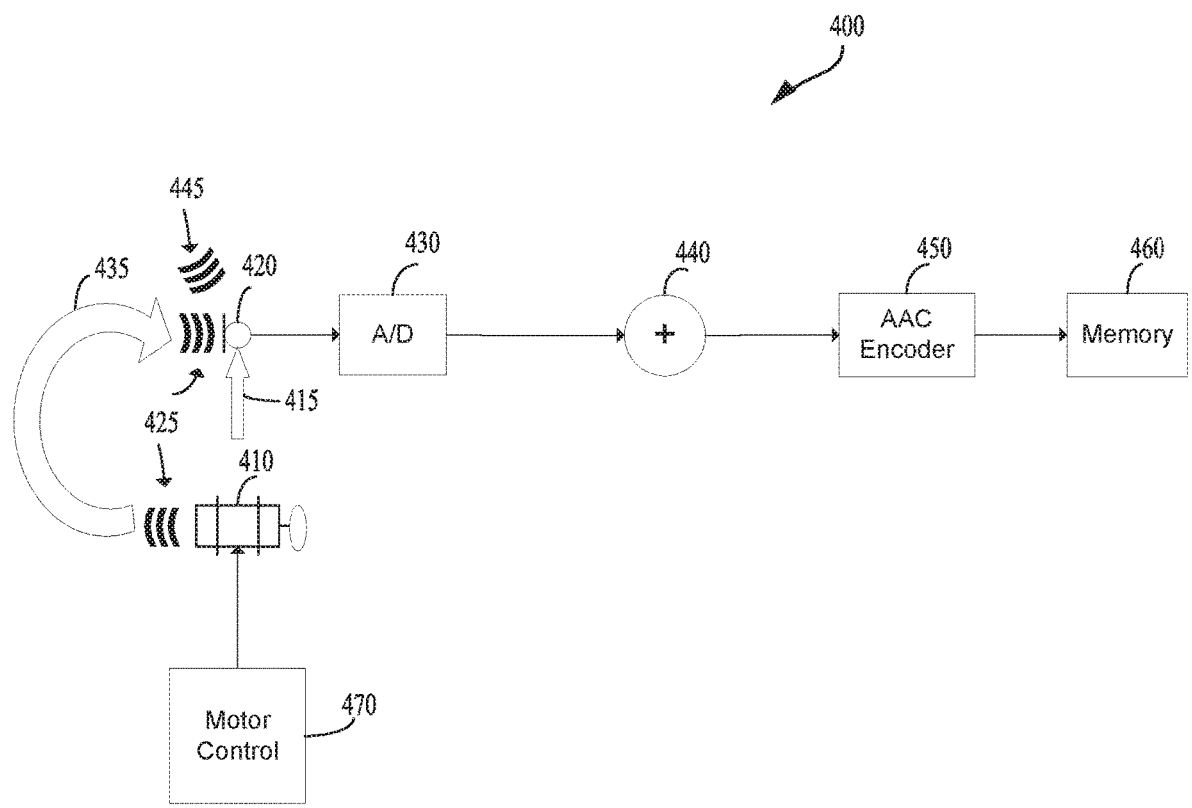
FIG. 4 is a signal processing diagram for an example of an image capture module showing interference from an integrated motorized gimbal.

FIG. 4 is a signal processing diagram for an example of an image capture module 400 showing interference from an integrated motorized gimbal. In this example, the image capture module 400 includes a motor 410, a microphone 420, an analog-to-digital (A/D) converter 430, a mixer 440, an advanced audio coding (AAC) encoder 450, and a memory 460. It is understood that the image capture module may include any number of motors and any number of microphones, and that the motor 410 and microphone 420 are shown merely for simplicity.

As shown in FIG. 4, the motor 410 receives a motor control signal 470 and generates a force 415 based on the motor control signal 470. The force 415 travels via a vibration path and is detected by the microphone 420. The motor 410 also generates an audible noise 425 when it is in use. The audible noise 425 travels via an acoustic path 435 and is detected by the microphone 420. Along with an intended sound 445, the microphone detects the interference caused by the force 415 and the audible noise 425 and sends these signals to the A/D converter 430. The A/D converter 430 receives the analog signals associated with the force 415, the audible noise 425, and the intended sound 445 and respectively converts them to digital signals. The respective digital signals are then combined by the mixer 440. The combined signals are further processed at the AAC encoder 450 and stored in the memory 460. The combination of the signals associated with the force 415, the audible noise 425, and the intended sound 445 result in an undesirable sound profile.

Figure 5:
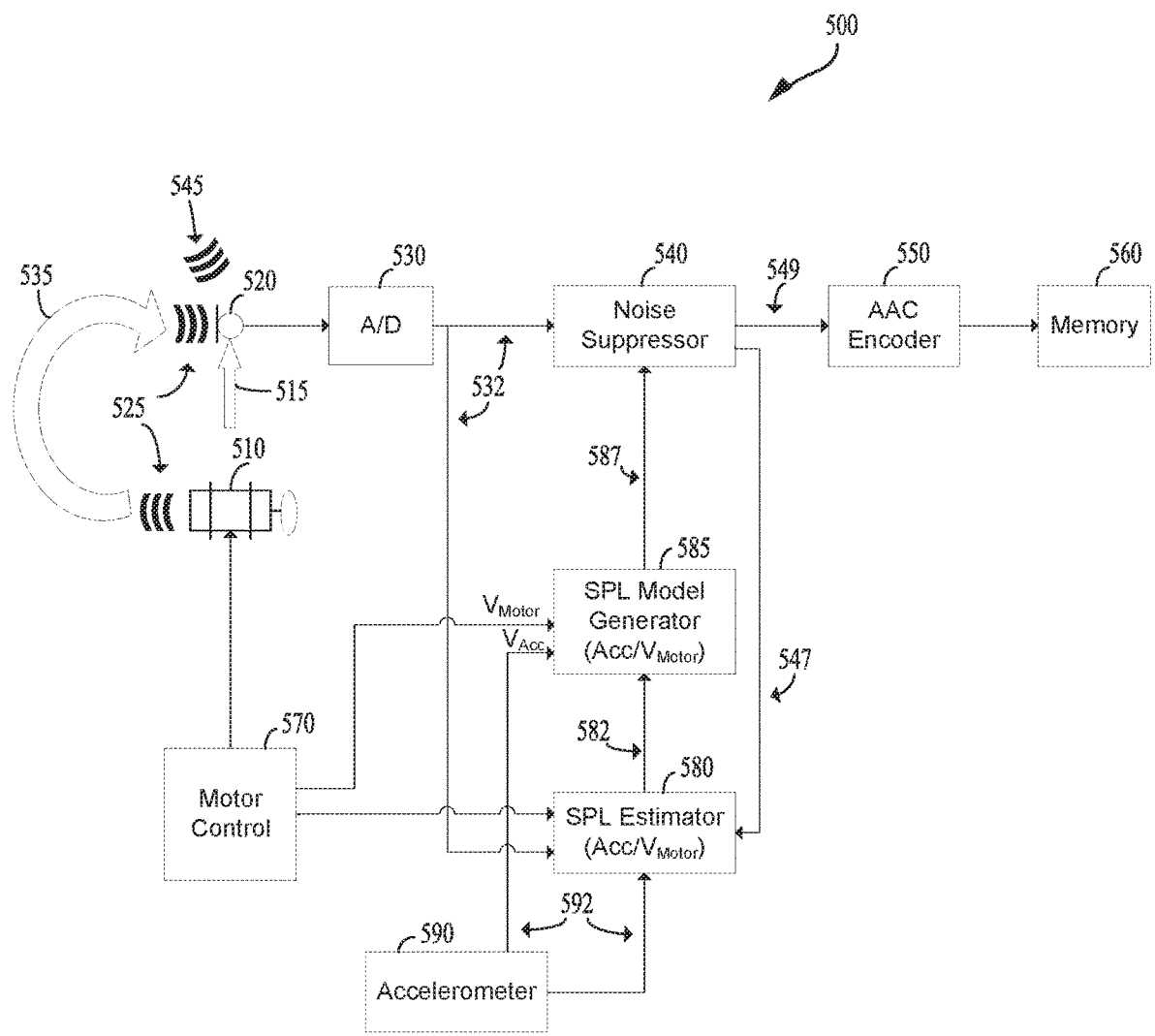
FIG. 5 is a signal processing diagram for an example of an image capture module configured to reduce interference from an integrated motorized gimbal.

FIG. 5 is a signal processing diagram for an example of an image capture module 500 configured to reduce interference from an integrated motorized gimbal. In this example, the image capture module 500 includes a motor 510, a microphone 520, an A/D converter 530, a noise suppressor 540, an AAC encoder 550, and a memory 560. The noise suppressor 540 may be implemented in conjunction with or include a mixer (not shown). It is understood that the image capture module 500 may include any number of motors and any number of microphones, and that the motor 510 and microphone 520 are shown merely for simplicity.

As shown in FIG. 5, a motor control signal 570 is transmitted to the motor 510, a sound pressure level (SPL) estimator 580, and an SPL model generator 585. The SPL estimator 580 and the SPL model generator 585 may collectively be referred to as a noise estimator model. In some embodiments, the SPL estimator and the SPL model generator may be combined into a single unit. In embodiments where there are more than one motor and/or microphone, each combination of microphone and motor may have a respective noise estimator model. For example, if the image capture module 500 includes three motors and three microphones, nine sets of noise estimator models may also be included. The motor 510 receives the motor control signal 570 and generates a force 515 based on the motor control signal 570. The force 515 travels via a vibration path and is detected by the microphone 520. The motor 510 also generates an audible noise 525 when it is in use. The audible noise 525 may be variable based on the action of the gimbal (i.e., panning, powering on, maintaining a position, or any other action). Each gimbal action may produce a unique noise profile. In some scenarios, the mechanical fit of each image capture module may affect the way the vibration is transferred from the motor to the microphone.

The audible noise 525 travels via an acoustic path 535 and is detected by the microphone 520. Along with an intended sound 545, the microphone detects the interference caused by the force 515 and the audible noise 525 and sends these signals to the A/D converter 530. The A/D converter 530 receives the analog signals associated with the force 515, the audible noise 525, and the intended sound 545 and respectively converts them to digital signals 532. The digital signals 532 are transmitted to the noise suppressor 540 and the SPL estimator 580.

An accelerometer 590 is configured to measure vibration information and transmit the vibration information as an accelerometer signal 592 to the SPL estimator 580 and the SPL model generator 585. The SPL estimator 580 receives the motor control signal 570, the digital signals 532 from the A/D converter 530, and the accelerometer signal 592 from the accelerometer 590. The SPL estimator 580 associates the motor control signal 570 with the digital signals 532 and the accelerometer signal 592 to generate model parameters. The model parameters may be based on the transfer functions of the motor control signal 570, the digital signals 532, and the accelerometer signal 592. The SPL estimator 580 transmits the model parameters 582 to the SPL model generator 585. The model parameters 582 may be predetermined, or they may be optimized or learned over time.

The SPL model generator 585 is configured to continuously estimate the sound pressure generated by the motor 510 based on the motor control signal 570 and the accelerometer signal 592. The SPL model generator 585 receives the motor control signal 570, the accelerometer signal 592 from the accelerometer 590, and the model parameters 582 from the SPL estimator 580. When the SPL estimator 580 determines that updated model parameters are produced, the updated model parameters are transmitted to the SPL model generator 585. In some embodiments, the SPL model generator may always receive the model parameters 582 and determine whether to update the model if the difference in parameters is above a threshold.

The SPL model generator 585 determines the unwanted portion of the digital signals 532 and generates a sound estimate based on the motor control signal 570, the accelerometer signal 592, and the model parameters 582 and transmits the sound estimate 587 to the noise suppressor 540. The sound estimate 587 is an estimate of the unwanted acoustic motor noise and the vibration motor noise produced by the gimbal motor that should be removed and may be expressed as a transfer function, for example $V_{Mic}(t)$.

The noise suppressor 540 receives the digital signals 532 from the A/D converter 530 and the sound estimate 587 from the SPL model generator 585. The noise suppressor 540 reduces the unwanted motor noises from the digital signals 532, such that the unwanted portion is subtracted from the digital signal 532. The noise suppressor 540 may perform this action in the time domain and/or frequency domain using any suitable signal processing method. For example, the noise suppressor 540 may invert the polarity of the sound estimate 587 such that the unwanted portion is subtracted from the digital signals 532. The resulting signal from the noise suppressor 540 is a signal 549 where the unwanted motor noises have been reduced. The signal 549 is further processed at the AAC encoder 550 and stored in the memory 560.

In some embodiments, the noise suppressor 540 may determine when to perform an estimate based on the microphone signal and production of how much of the microphone signal is created from the acoustic and vibration noise of the motor. If the noise suppressor 540 determines that the acoustic and vibration noise of the motor 510 is above a threshold, the noise suppressor generates and transmits a control signal 547 to the SPL estimator 580. For example, if the noise suppressor 540 determines that the microphone noise mostly consists of the acoustic and vibration noise of the motor 510, the noise suppressor sends control signal 547 to the SPL estimator 580 to perform an estimation and update the model parameters. In some embodiments, the noise suppressor 540 may determine that a signal quality is above a threshold, and send a control signal 547 to the SPL estimator 580 to stop performing estimates in order to conserve battery power. In this example, the SPL estimator 580 may resume performing estimates upon receiving a control signal from the noise suppressor 540 indicating that a signal quality level is below a threshold.

Figure 6:
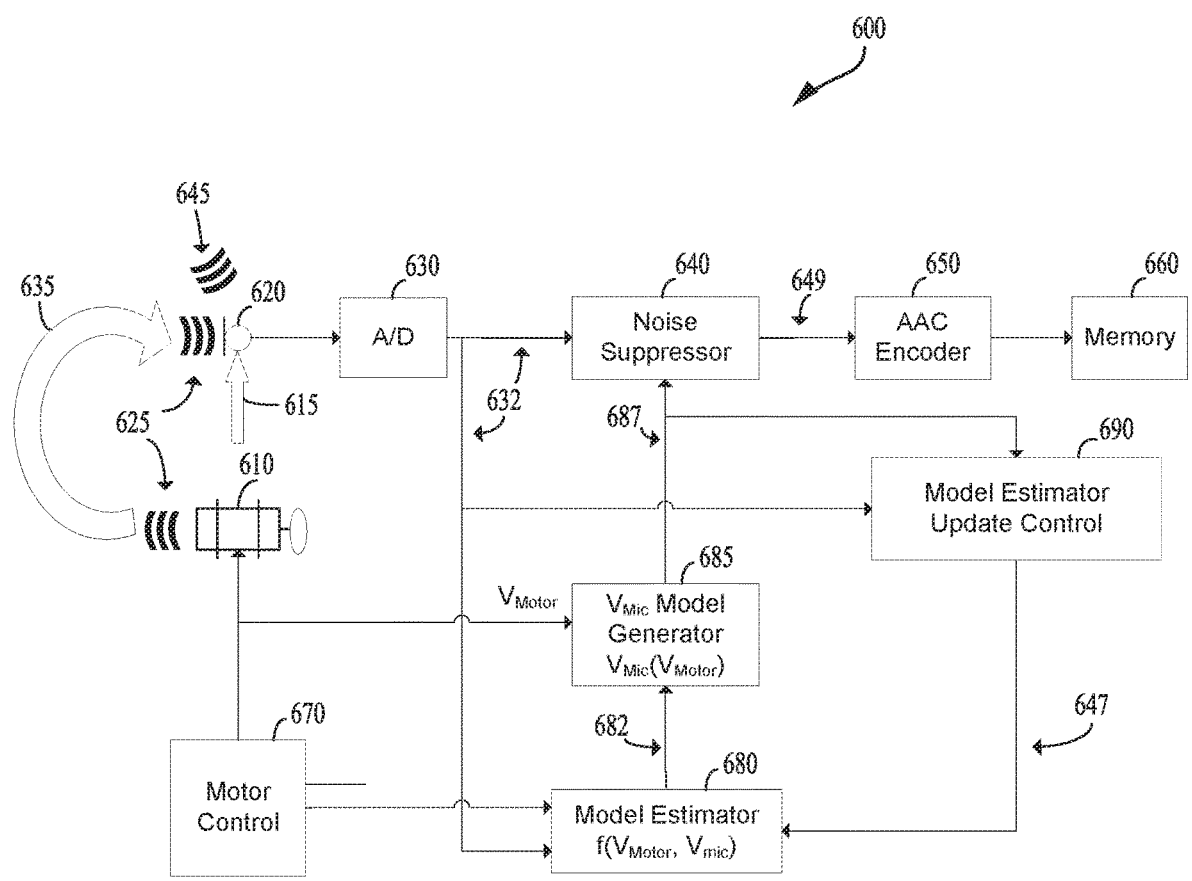
FIG. 6 is a signal processing diagram for an example of another image capture module configured to reduce interference from an integrated motorized gimbal.

FIG. 6 is a signal processing diagram for an example of another image capture module 600 configured to reduce interference from an integrated motorized gimbal. In this example, the image capture module 600 includes a motor 610, a microphone 620, an A/D converter 630, a noise suppressor 640, an AAC encoder 650, and a memory 660. The noise suppressor 640 may be implemented in conjunction with or include a mixer (not shown). It is understood that the image capture module 600 may include any number of motors and any number of microphones, and that the motor 610 and microphone 620 are shown merely for simplicity.

As shown in FIG. 6, the image capture module 600 includes a model estimator 680, a $V_{Mic}$ model generator 685, and a model estimator update control 690 which may be collectively referred to as a noise estimator model. In some embodiments, the model estimator 680, the $V_{Mic}$ model generator 685, and the model estimator update control 690 may be combined into a single unit. In embodiments where there are more than one motor and/or microphone, each combination of microphone and motor may have a respective noise estimator model. For example, if the image capture module 600 includes three motors and three microphones, nine sets of noise estimator models may also be included.

As shown in FIG. 6, a motor control signal 670 is transmitted to the motor 610, the model estimator 680, and the $V_{Mic}$ model generator 685. The motor 610 receives the motor control signal 670 and generates a force 615 based on the motor control signal 670. The force 615 travels via a vibration path and is detected by the microphone 620. The motor 610 also generates an audible noise 625 when it is in use. The audible noise 625 may be variable based on the action of the gimbal (i.e., panning, powering on, maintaining a position, or any other action). Each gimbal action may produce a unique noise profile. In some scenarios, the mechanical fit of each image capture module may affect the way the vibration is transferred from the motor to the microphone.

The audible noise 625 travels via an acoustic path 635 and is detected by the microphone 620. Along with an intended sound 645, the microphone 620 detects the interference caused by the force 615 and the audible noise 625 and sends these signals to the A/D converter 630. The A/D converter 630 receives the analog signals associated with the force 615, the audible noise 625, and the intended sound 645 and respectively converts them to digital signals 632. The digital signals 632 include the wanted and unwanted sounds detected by the microphone 620 and may be referred to as $V_{Mic}$. The digital signals 632 are transmitted to the noise suppressor 640, the model estimator 680, and a model estimator update control 690.

The model estimator 680 receives the motor control signal 670 and the digital signals 632 from the A/D converter 630. The model estimator 680 associates the motor control signal 670 with the digital signals 632 to generate model parameters. The model parameters may be based on the transfer functions of the motor control signal 670 and the digital signals 632. The model estimator 680 transmits the model parameters 682 to the $V_{Mic}$ model generator 685. The model parameters 682 may be predetermined, or they may be optimized or learned over time.

The $V_{Mic}$ model generator 685 is configured to continuously estimate the sound pressure generated by the motor 610 based on the motor control signal 670. The $V_{Mic}$ model generator 685 receives the motor control signal 670 and the model parameters 682 from the model estimator 680. The model estimator update control 690 may use the digital signals 632 and a sound estimate 687 to determine if the model parameters should be updated. When the model estimator update control 690 determines that updated model parameters are produced, it sends a control signal 647 to the model estimator 680 indicating that an update should be performed. The model estimator 680 performs an update, and the updated model parameters are transmitted to the $V_{Mic}$ model generator 685. In some embodiments, the $V_{Mic}$ model may always receive the model parameters 682 and determine whether to update the model if the difference in parameters is above a threshold.

The $V_{Mic}$ model generator 685 determines the unwanted portion of the digital signals 632 and generates a sound estimate based on the motor control signal 670 and the model parameters 682, and transmits the sound estimate 687 to the noise suppressor 640. The sound estimate 687 is an estimate of the unwanted acoustic motor noise and the vibration motor noise produced by the gimbal motor that should be removed and may be expressed as a transfer function, for example, $V_{MicNoise}$.

The noise suppressor 640 receives the digital signals 632 from the A/D converter 630 and the sound estimate 687 from the $V_{Mic}$ model generator 685. The noise suppressor 640 reduces the unwanted motor noises from the digital signals 632, such that the unwanted portion is subtracted from the digital signal 632. The noise suppressor 640 may perform this action in the time domain and/or frequency domain using any suitable signal processing method. For example, the noise suppressor 640 may invert the polarity of the sound estimate 687, such that the unwanted portion is subtracted from the digital signals 632. The resulting signal from the noise suppressor 640 is a signal 649 where the unwanted motor noises have been reduced. The signal 649 is further processed at the AAC encoder 650 and stored in the memory 660.

In an example where the $V_{Mic}$ model generator 685 is not continuously estimating the sound pressure generated by the motor 610, the model estimator update control 690 may determine when to perform an estimate based on the microphone signal (i.e., digital signals 632) and production of how much of the microphone signal is created from the acoustic and vibration noise of the motor (i.e., sound estimate 687). If the model estimator update control 690 determines that the acoustic and vibration noise of the motor 610 is above a threshold, the model estimator update control 690 generates and transmits a control signal 647 to the model estimator 680. For example, if the model estimator update control 690 determines that the microphone noise mostly consists of the acoustic and vibration noise of the motor 610, the model estimator update control 690 sends the control signal 647 to the model estimator 680 to perform an estimation and update the model parameters. In some embodiments, the model estimator update control 690 may determine that a signal quality is above a threshold, and send a control signal 647 to the model estimator 680 to stop performing estimates in order to conserve battery power. In this example, the model estimator 680 may resume performing estimates upon receiving a control signal from the model estimator update control 690 indicating that a signal quality level is below a threshold.

Figure 7:
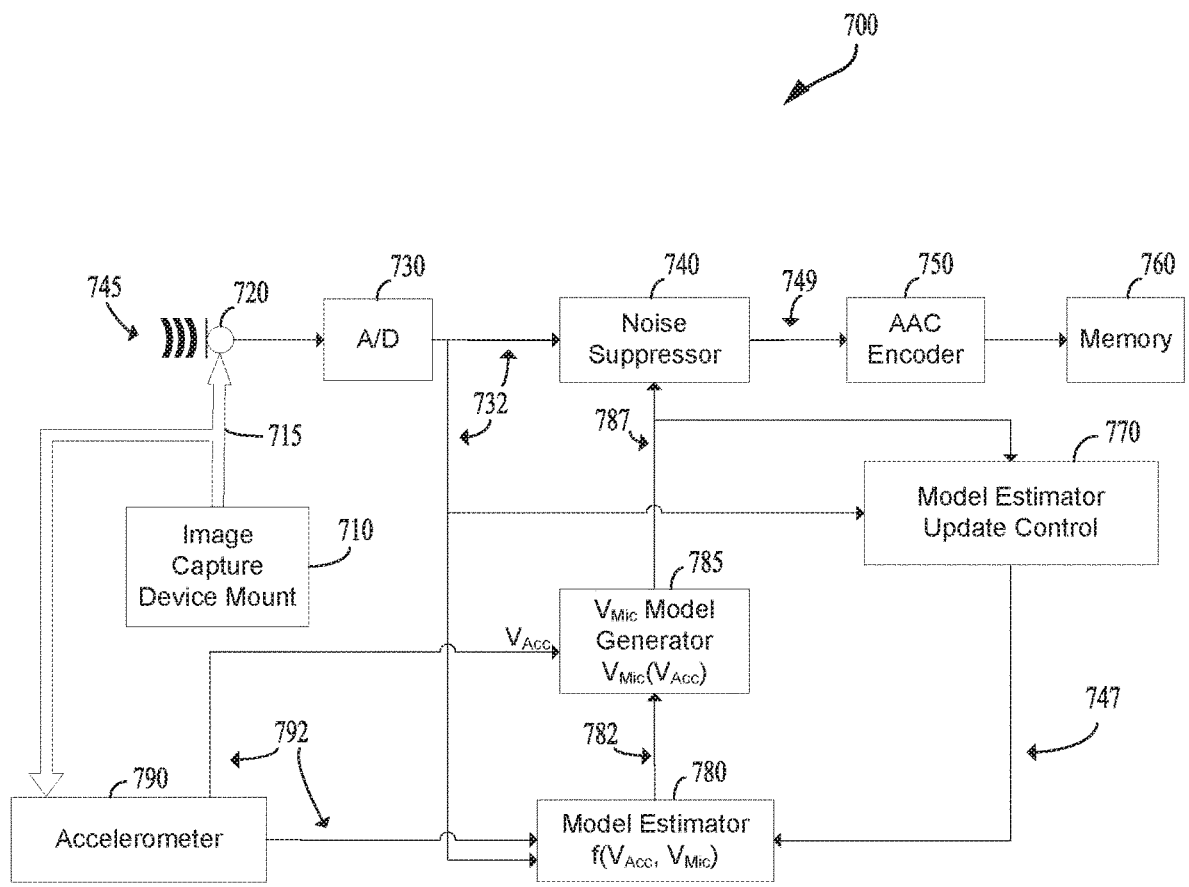
FIG. 7 is a signal processing diagram for an example of another image capture module configured to reduce interference from a non-motorized mount.

FIG. 7 is a signal processing diagram for an example of another image capture module 700 configured to reduce interference from a non-motorized mount. In this example, the image capture module 700 includes an image capture device mount 710, a microphone 720, an A/D converter 730, a noise suppressor 740, an AAC encoder 750, and a memory 760. The noise suppressor 740 may be implemented in conjunction with or include a mixer (not shown). It is understood that the image capture module 700 may include any number of microphones, and that the microphone 720 is shown merely for simplicity.

As shown in FIG. 7, the image capture module 700 includes a model estimator 780, a $V_{Mic}$ model generator 785, and a model estimator update control 770 which may be collectively referred to as a noise estimator model. In some embodiments, the model estimator 780, the $V_{Mic}$ model generator 785, and the model estimator update control 770 may be combined into a single unit. In embodiments that include more than one microphone, each microphone may have a respective noise estimator model. For example, if the image capture module 700 includes three microphones, three sets of noise estimator models may also be included.

As shown in FIG. 7, the image capture device mount 710 generates a force 715. The force 715 may be a vibration that travels via a vibration path and is detected by the microphone 720. The force 715 may be variable based on an action of the image capture device mount 710 and/or a device to which the image capture device mount 710 is attached. Each action may produce a unique noise profile. In some scenarios, the mechanical fit of each image capture module may affect the way the vibration is transferred from the image capture device mount 710 to the microphone 720.

Along with an intended sound 745, the microphone 720 detects the interference caused by the force 715 and sends these signals to the A/D converter 730. The A/D converter 730 receives the analog signals associated with the force 715 and the intended sound 745 and respectively converts them to digital signals 732. The digital signals 732 include the wanted and unwanted sounds detected from the microphone 720 and may be referred to as $V_{Mic}$. The digital signals 732 are transmitted to the noise suppressor 740, the model estimator 780, and a model estimator update control 770.

An accelerometer 790 detects the force 715 and converts the force 715 to accelerometer signals 792. The accelerometer signals 792 are transmitted to the model estimator 780 and the $V_{Mic}$ model generator 785, and may be referred to as $V_{Acc}$. The model estimator 780 receives the accelerometer signal 792 and the digital signals 732 from the A/D converter 730. The model estimator 780 associates the accelerometer signal 792 and the digital signals 732 to generate model parameters. The model parameters may be based on the transfer functions of the accelerometer signal 792 and the digital signals 732. The model estimator 780 transmits the model parameters 782 to the $V_{Mic}$ model generator 785. The model parameters 782 may be predetermined, or they may be optimized or learned over time.

The $V_{Mic}$ model generator 785 is configured to continuously estimate the sound pressure generated by the image capture device mount 710 based on the accelerometer signal 792. The $V_{Mic}$ model generator 785 receives the accelerometer signal 792 and the model parameters 782 from the model estimator 780. The model estimator update control 770 may use the digital signals 732 and the sound estimate 787 to determine if the model parameters should be updated. When the model estimator update control 770 determines that updated model parameters should be produced, it sends a control signal 747 to the model estimator 780 indicating that an update should be performed. The model estimator 780 performs an update, and the updated model parameters are transmitted to the $V_{Mic}$ model generator 785. In some embodiments, the $V_{Mic}$ model may always receive the model parameters 782 and determine whether to update the model if the difference in parameters is above a threshold.

The $V_{Mic}$ model generator 785 determines the unwanted portion of the digital signals 732 and generates a sound estimate based on the accelerometer signal 792 and the model parameters 782, and transmits the sound estimate 787 to the noise suppressor 740. The sound estimate 787 is an estimate of the unwanted vibration noise produced by the image capture device mount 710 that should be removed and may be expressed as a transfer function, for example, $V_{MicNoise}$.

The noise suppressor 740 receives the digital signals 732 from the A/D converter 730 and the sound estimate 787 from the $V_{Mic}$ model generator 785. The noise suppressor 740 reduces the unwanted motor noises from the digital signals 732 such that the unwanted portion is subtracted from the digital signal 732. The noise suppressor 740 may perform this action in the time domain and/or frequency domain using any suitable signal processing method. For example, the noise suppressor 740 may invert the polarity of the sound estimate 787 such that the unwanted portion is subtracted from the digital signals 732. The resulting signal from the noise suppressor 740 is a signal 749 where the unwanted motor noises have been reduced. The signal 749 is further processed at the AAC encoder 750 and stored in the memory 760.

In an example where the $V_{Mic}$ model generator 785 is not continuously estimating the sound pressure generated by the image capture device mount 710, the model estimator update control 770 may determine when to perform an estimate based on the microphone signal (i.e., digital signals 732) and production of how much of the microphone signal is created from the vibration noise of the image capture device mount (i.e., sound estimate 787). If the model estimator update control 770 determines that the vibration noise of the image capture device mount 710 is above a threshold, the model estimator update control 770 generates and transmits a control signal 747 to the model estimator 780. For example, if the model estimator update control 770 determines that the microphone noise mostly consists of the vibration noise of the image capture device mount 710, the model estimator update control 770 sends the control signal 747 to the model estimator 780 to perform an estimation and update the model parameters. In some embodiments, the model estimator update control 770 may determine that a signal quality is above a threshold, and send a control signal 747 to the model estimator 780 to stop performing estimates in order to conserve battery power. In this example, the model estimator 780 may resume performing estimates upon receiving a control signal from the model estimator update control 770 indicating that a signal quality level is below a threshold.

FIG. 8A is a block diagram of an example of a system 800 configured for image capture. The system 800 includes an image capture device 810 (e.g., the movable imaging assembly 160 or the movable imaging assembly 162) that includes a processing apparatus 812 that is configured to receive images from one or more image sensors 814. The image capture device 810 includes gimbals and motors 816 that are actuators of a mechanical stabilization system configured to control an orientation of the one or more image sensors 814 (e.g., an orientation with respect to a movable platform). The gimbals and motors 816 may be controlled by a controller of the mechanical stabilization system, which may be implemented by the processing apparatus 812 (e.g., as a software module or a specialized hardware module). The processing apparatus 812 may be configured to perform image signal processing (e.g., filtering, noise reduction, tone mapping, stitching, electronic image stabilization, and/or encoding) to generate output images based on image data from the one or more image sensors 814. The processing apparatus 812 may be configured to perform audio signal processing (e.g., filtering and/or noise reduction). The image capture device 810 includes one or more motion sensors 818 configured to detect motion of the one or more image sensors 814. The one or more motion sensors 818 may provide feedback signals to the mechanical stabilization system. The image capture device 810 includes a communications interface 822 for transferring images to other devices and/or receiving commands or other control signaling. The image capture device 810 includes a user interface 820, which may allow a user to control image capture functions and/or view images. The image capture device 810 includes a battery 824 for powering the image capture device 810. The image capture device includes a microphone 826 for detecting sounds. For example, the system 800 may be used to implement processes described in this disclosure.

The processing apparatus 812 may include one or more processors having single or multiple processing cores. The processing apparatus 812 may include memory, such as a random access memory (RAM) device, flash memory, or any other suitable type of storage device, such as a non-transitory computer readable memory. The memory of the processing apparatus 812 may include executable instructions and data that can be accessed by one or more processors of the processing apparatus 812. For example, the processing apparatus 812 may include one or more DRAM modules, such as double data rate synchronous dynamic random-access memory (DDR SDRAM). In some implementations, the processing apparatus 812 may include a digital signal processor (DSP). In some implementations, the processing apparatus 812 may include an application specific integrated circuit (ASIC). For example, the processing apparatus 812 may include a custom image signal processor. In some implementations, the processing apparatus 812 may have multiple processing units in different portions of the image capture device 810. For example, the processing apparatus 812 may include a processor on a movable platform (e.g., the aerial vehicle 120, the handheld module 130, and the personal recreational device module 135) and a processor in an image capture module (e.g., the image capture module 110 or the image capture module 200) that are removably attached by a connector.

The one or more image sensors 814 are configured to capture images. The one or more image sensors 814 are configured to detect light of a certain spectrum (e.g., the visible spectrum or the infrared spectrum) and convey information constituting an image as electrical signals (e.g., analog or digital signals). For example, the one or more image sensors 814 may include charge-coupled devices (CCD) or active pixel sensors in complementary metal-oxide-semiconductor (CMOS). The one or more image sensors 814 may detect light incident through a respective lens (e.g., a rectilinear lens or a fisheye lens). In some implementations, the one or more image sensors 814 include analog-to-digital converters. In some implementations, the one or more image sensors 814 have respective fields of view that overlap.

The mechanical stabilization system for the one or more image sensors 814 includes the gimbals and motors 816. The gimbals and motors 816 may be parts of a mechanical stabilization system (e.g., the mechanical stabilization system 220). The gimbals and motors 816 may attach the one or more image sensors 814 to a movable platform (e.g., the aerial vehicle 120 or the handheld module 130) via a connector (e.g., the connector 230) and control their orientation. The gimbals and motors 816 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 812 (e.g., as a software module or a specialized hardware module). Some implementations may not include the gimbals and motors 816.

The one or more motion sensors 818 are configured to detect motion of the one or more image sensors 814. For example, the one or more motion sensors 818 may include parts of an inertial measurement unit (e.g., including gyroscopes, accelerometers, and/or magnetometers) that is mounted in a housing with the one or more image sensors 814. In some implementations, the one or more motion sensors 818 may include parts of an inertial measurement unit that is mounted in a movable platform (e.g., the aerial vehicle 120, the handheld module 130, or the personal recreational device module 135) of the image capture device 810. In some implementations, the one or more motion sensors 818 include sensors (e.g., magnetic encoders, optical encoders, and/or potentiometers) that detect the state of the gimbals and motors 816 to measure a relative orientation of the image sensor and a movable platform of the image capture device 810. For example, the one or more motion sensors 818 may include encoders configured to detect a position and orientation of the image sensor relative to a movable platform (e.g., the aerial vehicle 120 or the handheld module 130). The processing apparatus 812 may be configured to determine a sequence of orientation estimates based on sensor data from the one or more motion sensors 818. For example, determining the sequence of orientation estimates may include applying quadratic estimation to sensor data from a plurality of the one or more motion sensors 818. In some implementations, the motion sensors include a GPS receiver that generates GPS position data for the image capture device 810.

The image capture device 810 may include a user interface 820. For example, the user interface 820 may include an LCD display for presenting images and/or messages to a user. For example, the user interface 820 may include a touchscreen display for interactively displaying images and other data and receiving user commands. For example, the user interface 820 may include a microphone for receiving voice commands from a user. For example, the user interface 820 may include a button or switch enabling a person to manually turn the image capture device 810 on and off. For example, the user interface 820 may include a shutter button for snapping pictures.

The image capture device 810 may include a communications interface 822, which may enable communications with a personal computing device (e.g., a smartphone, a tablet, a laptop computer, or a desktop computer) and one or more specialized controllers (e.g., the controller module 140 and/or the beacon module 150). For example, the communications interface 822 may be used to receive commands controlling image capture and processing in the image capture device 810. For example, the communications interface 822 may be used to transfer image data to a personal computing device or a specialized controller (e.g., the controller module 140). For example, the communications interface 822 may include a wired interface, such as a high-definition multimedia interface (HDMI), a universal serial bus (USB) interface, or a FireWire interface. For example, the communications interface 822 may include a wireless interface, such as a Bluetooth interface, a ZigBee interface, and/or a Wi-Fi interface.

The image capture device 810 may include a battery 824 that powers the image capture device 810 and/or its peripherals. For example, the battery 824 may be a detachable flight battery for an aerial vehicle. For example, the battery 824 may be a part of a handheld module. For example, the battery 824 may be charged wirelessly or through a micro-USB interface. In some implementations (not shown), the battery 824 may be replaced by another type of power supply (e.g., a capacitor that is charged by a circuit receiving power via an inductive coupling).

FIG. 8B is a block diagram of an example of a system 830 configured for image capture. The system 830 includes an image capture device 840 (e.g., the movable imaging assembly 160 or the movable imaging assembly 162) and a personal computing device 860 that communicate via a communications link 850. The image capture device 840 includes one or more image sensors 842 that are configured to capture images. The image capture device 840 includes a communications interface 848 configured to transfer images via the communication link 850 to the personal computing device 860. The personal computing device 860 includes a processing apparatus 862 that is configured to receive, using the communications interface 866, images from the one or more image sensors 842. The image capture device 840 includes gimbals and motors 844 that are actuators of a mechanical stabilization system configured to control an orientation of the one or more image sensors 842 (e.g., an orientation with respect to a movable platform). The gimbals and motors 844 may be controlled by a controller of the mechanical stabilization system, which may be implemented by the processing apparatus 862 (e.g., as a software module or a specialized hardware module) and provide control signals to the motors 844 via the communication link 850. The processing apparatus 862 may be configured to perform image signal processing (e.g., filtering, tone mapping, stitching, electronic image stabilization, and/or encoding) to generate output images based on image data from the one or more image sensors 842. The image capture device 840 includes one or more motion sensors 846 configured to detect motion of the one or more image sensors 842. The one or more motion sensors 846 may provide feedback signals (e.g., via the communication link 850 or internally within the image capture device 840) to the mechanical stabilization system. The image capture device 840 may also include one or more microphones (not shown).

The one or more image sensors 842 are configured to capture images. The one or more image sensors 842 are configured to detect light of a certain spectrum (e.g., the visible spectrum or the infrared spectrum) and convey information constituting an image as electrical signals (e.g., analog or digital signals). For example, the one or more image sensors 842 may include charge-coupled devices (CCD) or active pixel sensors in complementary metal-oxide-semiconductor (CMOS). The one or more image sensors 842 may detect light incident through a respective lens (e.g., a rectilinear lens or a fisheye lens). In some implementations, the one or more image sensors 842 include analog-to-digital converters. In some implementations, the one or more image sensors 842 have respective fields of view that overlap.

The processing apparatus 862 may include one or more processors having single or multiple processing cores. The processing apparatus 862 may include memory, such as a random access memory (RAM) device, flash memory, or any other suitable type of storage device, such as a non-transitory computer readable memory. The memory of the processing apparatus 862 may include executable instructions and data that can be accessed by one or more processors of the processing apparatus 862. For example, the processing apparatus 862 may include one or more DRAM modules, such as double data rate synchronous dynamic random-access memory (DDR SDRAM). In some implementations, the processing apparatus 862 may include a digital signal processor (DSP). In some implementations, the processing apparatus 862 may include an application specific integrated circuit (ASIC). For example, the processing apparatus 862 may include a custom image signal processor.

The mechanical stabilization system for the one or more image sensors 842 includes the gimbals and motors 844. The gimbals and motors 844 may be parts of a mechanical stabilization system (e.g., the mechanical stabilization system 220). The gimbals and motors 844 may connect the one or more image sensors 842 to a movable platform and control their orientation. The gimbals and motors 844 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 862 (e.g., as a software module or a specialized hardware module). For example, the controller of the mechanical stabilization system may be implemented by a specialized hardware module integrated with the image capture device 840.

The one or more motion sensors 846 are configured to detect motion of the one or more image sensors 842. For example, the one or more motion sensors 846 may include parts of an inertial measurement unit (e.g., including gyroscopes, accelerometers, and/or magnetometers) that is mounted in a housing with the one or more image sensors 842. In some implementations, the one or more motion sensors 846 may include parts of an inertial measurement unit that is mounted in a movable platform (e.g., the aerial vehicle 120, the handheld module 130, or the personal recreational device module 135) of the image capture device 840. In some implementations, the one or more motion sensors 846 include sensors (e.g., magnetic encoders, optical encoders, and/or potentiometers) that detect the state of the gimbals and motors 844 to measure a relative orientation of the image sensor and a movable platform of the image capture device 840. For example, the one or more motion sensors 846 may include encoders configured to detect a position and orientation of the image sensor relative to a movable platform (e.g., the aerial vehicle 120, the handheld module 130, or the personal recreational device module 135). The processing apparatus 862 may be configured to determine a sequence of orientation estimates based on sensor data from the one or more motion sensors 846. For example, determining the sequence of orientation estimates may include applying quadratic estimation to sensor data from a plurality of the one or more motion sensors 846. In some implementations, the motion sensors 846 include a GPS receiver that generates GPS position data for the image capture device 840.

The communications link 850 may be a wired communications link or a wireless communications link. The communications interface 848 and the communications interface 866 may enable communications over the communications link 850. For example, the communications interface 848 and the communications interface 866 may include a high-definition multimedia interface (HDMI), a universal serial bus (USB) interface, a FireWire interface, a Bluetooth interface, a ZigBee interface, and/or a Wi-Fi interface. For example, the communications interface 848 and the communications interface 866 may be used to transfer image data from the image capture device 840 to the personal computing device 860 for image signal processing (e.g., filtering, tone mapping, stitching, and/or encoding) to generate output images based on image data from the one or more image sensors 842. For example, the communications interface 848 and the communications interface 866 may be used to transfer motion sensor data from the image capture device 840 to the personal computing device 860 for processing in a controller of a mechanical stabilization system.

For example, the communications interface 848 and the communications interface 866 may be used to transfer control signals to the image capture device 840 from the personal computing device 860 for controlling the gimbals and motors 844 of a mechanical stabilization system and/or motion of an aerial vehicle of the image capture device 840.

The personal computing device 860 may include a user interface 864. For example, the user interface 864 may include a touchscreen display for presenting images and/or messages to a user and receiving commands from a user. For example, the user interface 864 may include a button or switch enabling a person to manually turn the personal computing device 860 on and off. In some implementations, commands (e.g., start recording video, stop recording video, snap photograph, or select tracking target) received via the user interface 864 may be passed on to the image capture device 840 via the communications link 850.

A user may switch between various usage scenarios of the movable imaging system 100, including, for example, the first usage scenario of FIG. 1A and the second usage scenario of FIG. 1B, to tailor their mode of image capture to varying circumstances.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. An image capture module comprising:
   an image sensor configured to capture images;
   an integrated mechanical stabilization system comprising a motor configured to control an orientation of the image sensor;
   an accelerometer configured to detect a vibration from the motor and generate an accelerometer signal based on the vibration, wherein the vibration produces a vibration noise;
   a microphone configured to receive an intended sound and noise from the motor, wherein the noise from the motor includes audible noise and the vibration noise;
   a processor configured to control the motor and generate a motor control signal;
   a noise estimator circuit comprising a sound pressure level (SPL) estimator portion configured to associate the motor control signal and the accelerometer signal and an SPL model generator portion configured to estimate a predicted sound pressure generated by the motor based on the motor control signal and the accelerometer signal; and
   a noise suppressor configured to receive a microphone signal obtained by the microphone and transmit a control signal to the SPL estimator portion based on a determination that the audible noise and the vibration noise of the motor are above a threshold, wherein the threshold is based on a proportion of the microphone signal to the audible noise and the vibration noise from the motor.

2. The image capture module of claim 1, wherein the SPL estimator portion is configured to receive the microphone signal, the motor control signal, and an accelerometer signal.

3. The image capture module of claim 2, wherein the SPL estimator portion is configured to generate a model parameter based on a transfer function of the microphone signal, the motor control signal, and the accelerometer signal.

4. The image capture module of claim 3, wherein the SPL model generator portion is configured to receive the motor control signal, the accelerometer signal, and the model parameter.

5. The image capture module of claim 4, wherein the SPL model generator portion is configured to generate a sound estimate based on the model parameter and a transfer function of the motor control signal and the accelerometer signal.

6. The image capture module of claim 5, wherein the noise suppressor is further configured to receive the microphone signal and the sound estimate.

7. The image capture module of claim 6, wherein the noise suppressor is further configured to reduce the noise from the motor by inverting the sound estimate and subtracting the inverted sound estimate from the microphone signal.

8. The image capture module of claim 6, wherein the noise suppressor is further configured to transmit feedback to the SPL estimator portion, wherein the feedback includes an indicator to update the model parameter.

9. The image capture module of claim 6, wherein the noise suppressor is further configured to transmit feedback to the SPL estimator portion, wherein the feedback includes an indicator to stop performing estimates.

10. An image capture module comprising:
    an image sensor configured to capture images;
    an accelerometer configured to detect a vibration and generate an accelerometer signal, wherein the vibration produces a vibration noise;
    a microphone configured to receive an intended sound and the vibration noise;
    a noise estimator circuit configured to estimate a predicted sound pressure based on a motor control signal and the accelerometer signal, the noise estimator circuit comprising a model estimator portion, a model generator portion, and a model estimator update control portion; and
    a noise suppressor configured to receive a microphone signal obtained by the microphone and transmit a control signal based on a determination that the vibration noise and audible noise are above a threshold, wherein the threshold is based on a proportion of the microphone signal to the vibration noise and audible noise.

11. The image capture module of claim 10, wherein the model estimator portion is configured to receive the microphone signal and the accelerometer signal.

12. The image capture module of claim 10, wherein the model estimator portion is configured to generate a model parameter based on a transfer function of the microphone signal and the accelerometer signal.

13. The image capture module of claim 12, wherein the model generator portion is configured to receive the accelerometer signal.

14. The image capture module of claim 13, wherein the model generator portion is configured to generate a sound estimate based on the model parameter and a transfer function of the accelerometer signal.

15. The image capture module of claim 14 wherein the noise suppressor is further configured to receive the microphone signal and the sound estimate.

16. The image capture module of claim 15, wherein the noise suppressor is further configured to reduce the vibration noise by inverting the sound estimate and subtracting the inverted sound estimate from the microphone signal.

17. The image capture module of claim 15, wherein the noise suppressor is further configured to transmit feedback to the model estimator update control portion.

18. The image capture module of claim 15, wherein the model estimator update control portion is configured to determine whether to update the model parameter, wherein the determination is based on the sound estimate and the microphone signal.

19. The image capture module of claim 18, wherein the model estimator portion is configured to receive, from the model estimator update control portion, a control signal that indicates a model parameter update, wherein the model estimator portion is further configured to perform the model parameter update based on the control signal.

20. The image capture module of claim 15, wherein the model estimator update control portion is further configured to transmit feedback to the model estimator portion, wherein the feedback includes an indicator to stop performing estimates.

* * * * *